(12) United States Patent
Choi et al.

US011330197B2

(10) Patent No.: US 11,330,197 B2
(45) Date of Patent: May 10, 2022

(54) METHOD FOR PROCESSING IMAGE DATA BY USING INFORMATION GENERATED FROM EXTERNAL ELECTRONIC DEVICE, AND ELECTRONIC DEVICE

(71) Applicant: Samsung Electronics Co., Ltd., Gyeonggi-do (KR)

(72) Inventors: Jong-Bum Choi, Gyeonggi-do (KR); Sung-Oh Kim, Gyeonggi-do (KR); Young-Jo Kim, Gyeonggi-do (KR); Hyung-Ju Chun, Gyeonggi-do (KR); Ha-Joong Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 214 days.

(21) Appl. No.: 16/652,159

(22) PCT Filed: Sep. 27, 2018

(86) PCT No.: PCT/KR2018/011356
§ 371 (c)(1),
(2) Date: Mar. 30, 2020

(87) PCT Pub. No.: WO2019/066450
PCT Pub. Date: Apr. 4, 2019

(65) Prior Publication Data
US 2020/0252555 A1 Aug. 6, 2020

(30) Foreign Application Priority Data
Sep. 29, 2017 (KR) .......................... 10-2017-0127582

(51) Int. Cl.
*H04N 5/262* (2006.01)
*H04N 19/115* (2014.01)
*H04N 19/167* (2014.01)
*H04N 19/179* (2014.01)
*H04N 5/232* (2006.01)

(52) U.S. Cl.
CPC ....... *H04N 5/2628* (2013.01); *H04N 5/23232* (2013.01); *H04N 19/115* (2014.11); *H04N 19/167* (2014.11); *H04N 19/179* (2014.11)

(58) Field of Classification Search
CPC ............. H04N 5/2628; H04N 5/23232; H04N 19/115; H04N 19/167; H04N 19/179;
(Continued)

(56) References Cited

U.S. PATENT DOCUMENTS 7,020,342 B1 3/2006 Kleihorst et al.
2004/0196502 A1 10/2004 Mikawa
(Continued)

FOREIGN PATENT DOCUMENTS

JP 2002-521880 7/2002
JP 2003-174579 6/2003
(Continued)

OTHER PUBLICATIONS

PCT/ISA/210 Search Report dated Dec. 24, 2018 issued on PCT/KR2018/011356, pp. 5.
(Continued)

*Primary Examiner* — Chiawei Chen
(74) *Attorney, Agent, or Firm* — The Farrell Law Firm, P.C.

(57) ABSTRACT

An electronic device according to various embodiments of the present invention comprises a camera, a communication module, a display and a processor, wherein the processor can be set so as to: acquire a raw image corresponding to an external object by using the camera; generate a first level image having a first attribute and a second level image having a second attribute by using the raw image; transmit a first image, in which at least a part of the first level image is encoded, to an external electronic device by using the communication module such that the external electronic
(Continued)

device generates analysis information on the first image; and generate a second image, in which at least a part of the second level image is encoded, on the basis of at least the analysis information, and transmit the second image to the external electronic device by using the communication module. Other embodiments could be possible in addition to the various embodiments of the present invention.

15 Claims, 25 Drawing Sheets

(58) Field of Classification Search
CPC ........... H04N 5/23203; H04N 5/23229; H04N 5/272; H04N 19/124; H04N 19/136; H04N 19/17; H04N 21/2343; H04N 21/234327; H04N 21/234363; G06T 5/50; G06T 2207/20221
See application file for complete search history.

(56) References Cited

U.S. PATENT DOCUMENTS

| | | | |
|---|---|---|---|
| 2009/0189985 A1* | 7/2009 | Noh | H04N 5/23229 348/175 |
| 2012/0219272 A1 | 8/2012 | Eto et al. | |
| 2012/0268612 A1 | 10/2012 | Wang et al. | |
| 2013/0294495 A1 | 11/2013 | Rossato et al. | |
| 2014/0085501 A1 | 3/2014 | Tran | |
| 2014/0267833 A1* | 9/2014 | Chen | G06T 5/003 348/239 |
| 2016/0196286 A1 | 7/2016 | Kim et al. | |
| 2018/0293453 A1* | 10/2018 | Viswanathan | G06K 9/46 |
| 2018/0346150 A1* | 12/2018 | Remond | B64F 5/60 |

FOREIGN PATENT DOCUMENTS

| | | |
|---|---|---|
| JP | 2010-051013 | 3/2010 |
| JP | 2011176490 A * | 9/2011 |
| JP | 2014-524213 | 9/2014 |
| KR | 1020160084147 | 7/2016 |
| WO | WO 2007-066925 | 6/2007 |

OTHER PUBLICATIONS

PCT/ISA/237 Written Opinion dated Dec. 24, 2018 issued on PCT/KR2018/011356, pp. 5.
KR Decision of Grant dated Feb. 19, 2022 issued in counterpart application No. 10-2017-0127587, 6 pages.

* cited by examiner

METHOD FOR PROCESSING IMAGE DATA BY USING INFORMATION GENERATED FROM EXTERNAL ELECTRONIC DEVICE, AND ELECTRONIC DEVICE

PRIORITY

This application is a National Phase Entry of International Application No. PCT/KR2018/011356, which was filed on Sep. 27, 2018, and claims priority to Korean Patent Application No. 10-2017-0127582 filed in the Korean Intellectual Property Office on Sep. 29, 2017, the content of each of which is incorporated herein by reference.

TECHNICAL FIELD

The disclosure relates to an electronic device for processing image data acquired using a camera and a method for processing image data in the electronic device.

BACKGROUND ART

An electronic device, which processes an image, may acquire a raw image through an image sensor, and may process the acquired raw image by using a built-in Image Signal Processor (ISP). The ISP may process the received raw image by using an image quality improvement algorithm, and thus may provide an image with improved image quality. An image processor may perform various processings, including white balance adjustment, color adjustment (e.g., color matrix, color correction, or color enhancement), color filter array interpolation, noise reduction processing or sharpening, image enhancement (e.g., High Dynamic Range (HDR) or face detection), and the like. An image output from the ISP may have, for example, a YUV format. An image output from the ISP may be compressed according to, for example, a Joint Photographic Experts Group (JPEG) scheme, and the compressed image may be stored in an electronic device.

According to various embodiments, a service is provided by an image processing cloud system for backing up an image and generating a new media content. A computer vision-based technology, for example, a technique such as image matching, which is difficult to be performed by a terminal apparatus, can be applied to an image uploaded to a cloud server. For example, the cloud server may perform image recognition by using machine learning-based software.

DETAILED DESCRIPTION OF THE INVENTION

Technical Problem

An ISP is mainly disposed in an Application Processor (AP) of an electronic device. Due to disposition of an ISP in an AP, a rise in chip price and the issue of heat generation is continuing. In addition, according to changing sensor specifications and modification of a processing algorithm accordingly, a problem may occur in that the electronic device processing an image should also have a new hardware ISP disposed therein.

An electronic device processing an image according to various embodiments may acquire, from an external electronic device (e.g., a cloud server), image correction information which is difficult for an ISP of the electronic device to calculate or takes a lot of time to calculate, and may process an image by using the acquired image correction information. Accordingly, image correction according to the most recent algorithm may be performed.

Various embodiments may provide an electronic device and a method for processing image data in the electronic device which differentially processes images according to importance levels of respective regions based on image correction information, obtained through analysis by an external electronic device, during processing of a raw image captured by an image sensor, and thus can achieve an improvement in image quality by using information of the same data size.

Technical Solution

In accordance with an aspect of the disclosure, an electronic device may include a camera, a communication module, a display, and a processor, wherein the processor is configured to: acquire a raw image corresponding to an external object by using the camera; generate a first-level image having a first attribute and a second-level image having a second attribute, by using the raw image; transmit a first image obtained by encoding at least a part of the first-level image to an external electronic device by using the communication module so that the external electronic device generates analysis information of the first image; generate a second image by encoding at least a part of the second-level image at least based on the analysis information; and transmit the second image to the external electronic device by using the communication module.

In accordance with another aspect of the disclosure, an electronic device may include a communication module and a processor, wherein the processor is configured to: receive a first image, obtained by encoding a first-level image having a first attribute and generated from a raw image acquired by a camera, from an external electronic device by using the communication module; decode the received first image; generate analysis information by analyzing the decoded first image; transmit the generated analysis information to the external electronic device; receive a second image, obtained by encoding a second-level image having a second attribute and generated from the raw image based on the analysis information, from the external electronic device; and generate a synthesized image by merging the decoded first image and the received second image.

In accordance with still another aspect of the disclosure, a method for processing image data by an electronic device according to one of various embodiments may include: acquiring a raw image corresponding to an external object by using a camera; generating a first-level image having a first attribute and a second-level image having a second attribute, by using the raw image; transmitting a first image obtained by encoding at least a part of the first-level image to an external electronic device so that the external electronic device generates analysis information of the first image; generating a second image by encoding at least a part of the second-level image at least based on the analysis information; and transmitting the second image to the external electronic device.

In accordance with yet another aspect of the disclosure, a method for processing image data by an electronic device according to one of various embodiments may include: receiving a first image, obtained by encoding a first-level image having a first attribute and generated from a raw image acquired by a camera, from an external electronic device; decoding the received first image; generating analysis information by analyzing the decoded first image; transmitting the generated analysis information to the external electronic device; receiving a second image, obtained by encoding a second-level image having a second attribute and generated from the raw image based on the analysis information, from the external electronic device; and generating a synthesized image by merging the decoded first image and the received second image.

Advantageous Effects

An electronic device and a method for processing image data according to various embodiments differentially process images according to importance levels of respective regions during processing of a raw image captured by an image sensor, and thus can achieve an improvement in image quality by using information of the same data size.

For example, an electronic device, which encodes an image, can use image information obtained through analysis by an external electronic device (e.g., a cloud server) in order to determine the contents of information (e.g., an order, the amount of information, and a method) of scalable image data. Therefore, compared to the related art, an improvement in image quality, an improvement in an image recognition rate, and the like can be achieved using extended-level image information of the same data size.

MODE FOR CARRYING OUT THE INVENTION

Figure 1:
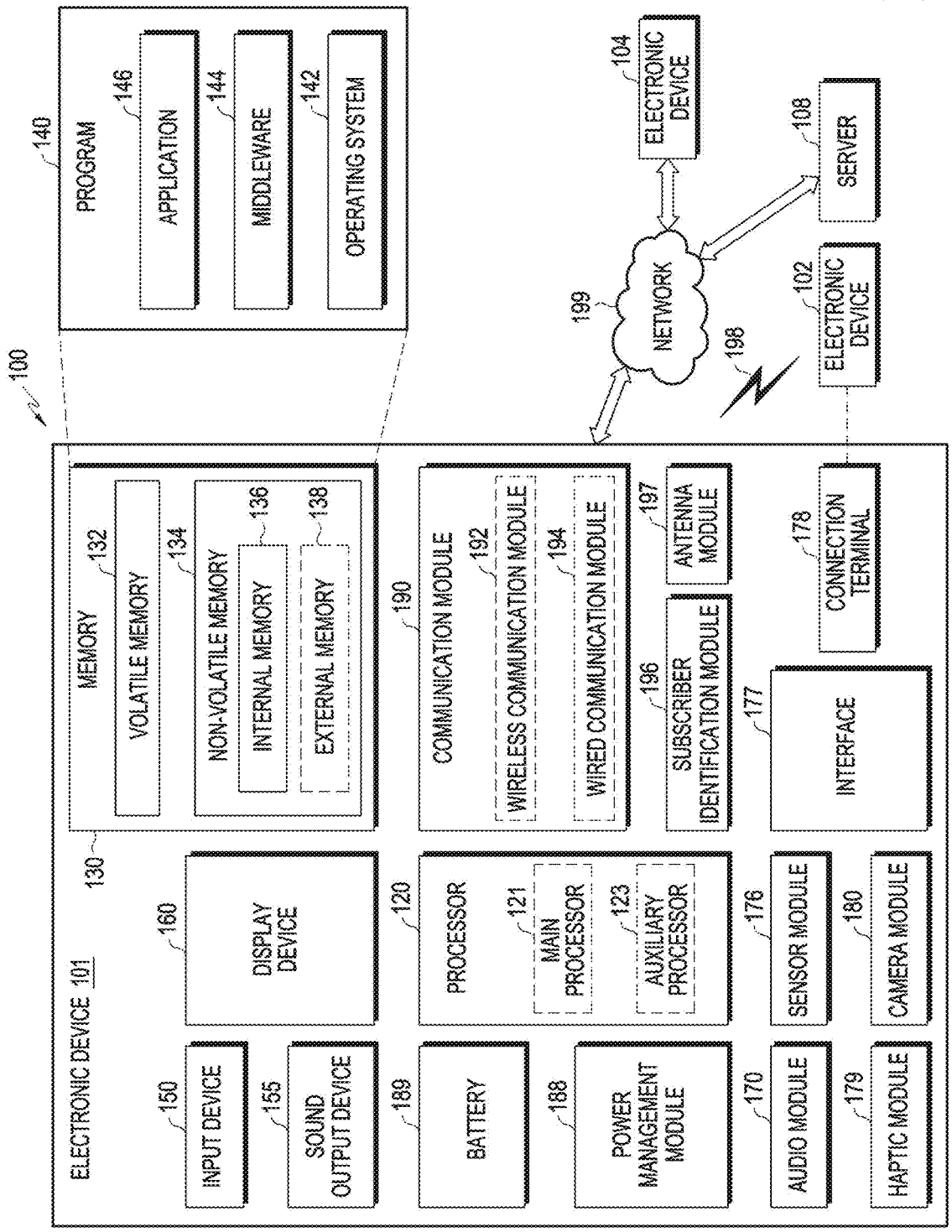
FIG. 1 is a diagram illustrating an example of a network configuration according to an embodiment of the disclosure.

Hereinafter, various embodiments of the disclosure will be described with reference to the accompanying drawings. However, there is no intent to limit the technology described in the disclosure to the particular embodiments, and the disclosure should be understood to include various modifications, equivalents, and/or alternatives of the embodiments disclosed herein. In describing the drawings, similar reference numerals may be used to designate similar elements.

In the disclosure, the expression "have", "may have", "include", or "may include" refers to the existence of a corresponding feature (e.g., numerical value, function, operation, or elements such as components), and does not exclude the existence of additional features.

In the disclosure, the expression "A or B", "at least one of A or/and B", or "one or more of A or/and B" may include all possible combinations of the items enumerated together. For example, "A or B", "at least one of A and B", or "at least one of A or B" may refer to all of (1) including at least one A, (2) including at least one B, and (3) including both at least one A and at least one B.

The expression "a first", "a second", "the first", or "the second" used in the disclosure may modify various elements regardless of the order and/or the importance, and is used only to distinguish one element from another element, but does not limit the corresponding elements. For example, a first user device and a second user device may indicate different user devices regardless of the sequence or importance thereof. For example, a first element may be termed a second element, and similarly, a second element may be termed a first element without departing from the scope of the disclosure.

When an element (e.g., a first element) is mentioned to be "(operatively or communicatively) coupled with/to", or "connected to", another element (e.g., a second element), it should be understood that the element is connected to said another element directly or through any other element (e.g., a third element). In contrast, when an element (e.g., a first element) is mentioned to be "directly coupled with/to", or "directly connected to", another element (e.g., a second element), it may be understood that there is no element (e.g., a third element) between the element and said another element.

The expression "configured to" used herein may be used interchangeably with, for example, the expression "suitable for", "having the capacity to", "designed to", "adapted to", "made to", or "capable of" according to the circumstances. The term "configured to" may not necessarily mean "specifically designed to" in hardware. Instead, in some situations, the expression "device configured to" may mean that the device, together with other devices or components, is "capable of". For example, the phrase "processor configured to perform A, B, and C" may refer to a dedicated processor (e.g., an embedded processor) for performing the corresponding operations or a generic-purpose processor (e.g., a Central Processing Unit (CPU) or an Application Processor (AP)) capable of performing the corresponding operations by executing one or more software programs stored in a memory device.

The terms used herein are merely for the purpose of describing particular embodiments, and are not intended to limit the scope of other embodiments. As used herein, singular forms may include plural forms unless the context clearly indicates otherwise. The terms used herein, including technical or scientific terms, may have the same meanings as commonly understood by those having general knowledge in the technical field to which the disclosure pertains. Terms defined in common dictionaries among the terms used herein may be interpreted to have the meanings identical or similar to the contextual meanings in the relevant field of art, and are not to be interpreted to have ideal or excessively formal meanings unless clearly defined in the disclosure. In some cases, even the term defined in the disclosure may not be interpreted to exclude embodiments.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 Audio Layer-3 (MP3) player, a mobile medical device, a camera, or a wearable device (e.g., smart glasses, a Head-Mounted Device (HMD), an electronic clothing, an electronic bracelet, an electronic necklace, an electronic accessory, an electronic tattoo, a smart mirror, or a smart watch).

In some embodiments, the electronic device may be a home appliance. The home appliance may include at least one of, for example, a Television (TV), a Digital Video Disc (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other embodiments, the electronic device may include at least one of various medical devices (e.g., various portable medical measuring devices (a blood glucose measuring device, a heart rate measuring device, a blood pressure measuring device, or a body temperature measuring device), a Magnetic Resonance Angiography (MRA), a Magnetic Resonance Imaging (MRI), a Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, an electronic device for a ship (e.g., a navigation device for a ship, or a gyrocompass), avionics, a security device, an automotive head unit, an industrial or home robot, an Automated Teller Machine (ATM) in a financial institution, a Point of Sales (POS) device in a shop, or an Internet-of-Things (IoT) device (e.g., a light bulb, various sensors, an electric or gas meter, a sprinkler, a fire alarm, a thermostat, a streetlamp, a toaster, sporting goods, a hot water tank, a heater, or a boiler).

According to some embodiments, the electronic device may include at least one of a piece of furniture or a part of a building/structure, an electronic board, an electronic signature receiving device, a projector, or various measuring instruments (e.g., a water meter, an electric meter, a gas meter, or a radio wave meter). In various embodiments, the electronic device may be one or a combination of two or more of the above-described various devices. The electronic device according to some embodiments may be a flexible device. Further, the electronic device according to an embodiment is not limited to the above-described devices, and may include a new electronic device according to the advancement of technology.

The various embodiments of the disclosure described below provide an electronic device and a method for processing image data in the electronic device which differentially processes images according to importance levels of respective regions based on image correction information, obtained through analysis by an external electronic device, during processing of a raw image captured by an image sensor, and thus can achieve an improvement in image quality by using information of the same data size.

In the various embodiments of the disclosure described below, for convenience of description, image data acquired by an image sensor (e.g., a camera) will be referred to as a "raw image" or "raw image data". The term "raw image" is not limited to referring to data in a particular format, but refers to the concept in its broadest sense so as to represent data acquired by an image sensor before passing through image processing for becoming data in a particular format. For example, according to various embodiments, a raw image may have various formats depending on the type, size, formation, and the like of an image sensor. For example, the raw image may include data of multiple pixels constituting a frame corresponding to one entire image, and a pixel value of each pixel may be expressed as multiple bits so as to be processed.

In the various embodiments of the disclosure described below, the term "basic image" may refer to an image including at least one piece of information among information on a low-resolution image having a reduced size or resolution compared to a raw image acquired by a camera, information on a low-frequency domain image of the raw image, and information on a higher bit-plane image of the raw image, and for convenience of description, the basic image may be referred to as a "basic-level image", a "basic-layer image", a "first-level image", or the like.

In the various embodiments of the disclosure described below, the term "extended image" may refer to an image including at least one of a high-resolution image having an extended size or resolution compared to the basic image or the first-level image, an image including higher frequency information than the first-level image, or an image including lower bit-plane information than the first-level image, and for convenience of description, the extended image may be referred to as an "extended-level image", an "extended-layer image", a "second-level image", or the like. According to various embodiments, the term "extended image" may refer to an image identical or similar to the raw image.

According to various embodiments, a raw image may at least include the basic image or the extended image, and the basic image or the extended image may be generated through conversion from the raw image according to various algorithms. According to various embodiments, a basic image or an extended image may include at least a part of the raw image, and the basic image may include at least a part of the extended image. Various embodiments for generating the basic image or the extended image will be described below.

In the various embodiments of the disclosure described below, a bit plane may include at least one bit, and when a pixel value of a particular pixel constituting image data is expressed as bit values, bit planes may correspond to positions (or places) for expression of the bit values, respectively. For example, when a pixel value of each pixel is expressed as 10-bit data including a 0-th bit to a ninth bit (a Most Significant Bit (MSB)), bit position-specific bit planes may be configured based on data corresponding to the same bit positions in respective pixel values of multiple pixels. For example, when the pixel value is 10-bit data, it is possible to configure a 0-th bit plane corresponding to the 0-th bits from the multiple pixels, a first bit plane corresponding to the first bits therefrom, . . . , and a ninth bit plane corresponding to the ninth bits therefrom. Hereinafter, an electronic device according to various embodiments will be described with reference to the accompanying drawings. In the disclosure, the term "user" may refer to a person using an electronic device or an apparatus (e.g., an artificial intelligence electronic device) using an electronic device.

FIG. 1 is a block diagram illustrating an electronic device 101 in a network environment 100 according to various embodiments of the disclosure. Referring to FIG. 1, the electronic device 101 in the network environment 100 may communicate with an electronic device 102 via a first network 198 (e.g., a short-range wireless communication), or an electronic device 104 or a server 108 via a second network 199 (e.g., a long-range wireless communication). According to an embodiment, the electronic device 101 may communicate with the electronic device 104 via the server 108. According to an embodiment, the electronic device 101 may include a processor 120, memory 130, an input apparatus 150, a sound output apparatus 155, a display apparatus 160, an audio module 170, a sensor module 176, an interface 177, a haptic module 179, a camera module 180, a power management module 188, a battery 189, a communication module 190, a Subscriber Identification Module (SIM) 196, and an antenna module 197. In some embodiments, at least one (e.g., the display apparatus 160 or the camera module 180) of the elements may be omitted from the electronic device 101, or another element may be added in the electronic device 101. In some embodiments, as in the case of, for example, the sensor module 176 (e.g., a fingerprint sensor, an iris sensor, or an illuminance sensor) embedded in the display apparatus 160 (e.g., a display), some elements may be integrated into a single element.

The processor 120 may execute, for example, software (e.g., a program 140) so as to control at least one other element (e.g., a hardware or software element) of the electronic device 101 connected to the processor 120, and may perform various data processing and computation operations. The processor 120 may load a command or data received from another element (e.g., the sensor module 176 or the communication module 190) in volatile memory 132, process the command or the data read from the volatile memory 132, and store resulting data in non-volatile memory 134. According to an embodiment, the processor 120 may include: a main processor 121 (e.g., a Central Processing Unit (CPU) or an Application Processor (AP)); and an auxiliary processor 123 (e.g., a Graphics Processing Unit (GPU), an Image Signal Processor (ISP), a sensor hub processor, or a Communication Processor (CP)) that is operated independently of the main processor 121, and additionally or alternatively, consumes less power than the main processor 121, or is specialized for a specified function. In this example, the auxiliary processor 123 may be operated separately from the main processor 121 or in a state of being embedded therein.

In this configuration, the auxiliary processor 123 may control at least some of functions or states related to at least one element (e.g., the display apparatus 160, the sensor module 176, or the communication module 190) among the elements of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as a partial element of another element (e.g., the camera module 180 or the communication module 190) functionally related to the auxiliary processor 123. The memory 130 may store various data, for example, software (e.g., the program 140) and input data or output data for a command related thereto, used by at least one element (e.g., the processor 120 or the sensor module 176) of the electronic device 101. The memory 130 may include the volatile memory 132 or the non-volatile memory 134.

The program 140 may include, for example, an operating system (OS) 142, middleware 144, or an application 146, as software stored in the memory 130.

The input apparatus 150 may be configured to receive a command or data to be used by other element (e.g., the processor 120) of the electronic device 101, from the outside (e.g., a user) of the electronic device 101, and may include, for example, a microphone, a mouse, or a keyboard.

The sound output apparatus 155 may be configured to output sound signals to the outside of the electronic device 101, and may include, for example, a speaker used for general purposes such as reproduction of multimedia or reproduction of a recorded sound or a receiver exclusively used for an incoming call. According to an embodiment, the receiver may be integrated with the speaker or may be implemented separately therefrom.

The display apparatus 160 may be configured to visually provide information to a user of the electronic device 101, and may include, for example, a display, a hologram apparatus, a projector, or control circuitry configured to control a corresponding one of the display, the hologram apparatus, and the projector. According to an embodiment, the display apparatus 160 may include touch circuitry or a pressure sensor capable of measuring the strength of pressure generated by a touch.

The audio module 170 may bidirectionally convert between a sound and an electrical signal. According to an embodiment, the audio module 170 may obtain the sound via the input apparatus 150, or output the sound via the sound output apparatus 155 or a headphone of an external electronic device (e.g., an electronic device 102) wiredly or wirelessly connected to the electronic device 101.

The sensor module 176 may generate an electrical signal or data value corresponding to an operational state (e.g., power or temperature) within the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, or an illuminance sensor.

The interface 177 may support a specified protocol which allows a wired or wireless connection with the external electronic device (e.g., the electronic device 102). According to an embodiment, the interface 177 may include a High Definition Multimedia Interface (HDMI), a Universal Serial Bus (USB) interface, a Secure Digital (SD) card interface, or an audio interface.

A connecting terminal 178 may include a connector, for example, a HDMI connector, a USB connector, a SD card connector, or an audio connector (e.g., a headphone connector), capable of physically connecting the electronic device 101 to the external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be configured to manage power supplied to the electronic device 101, and may be configured as at least part of, for example, a power management integrated circuit (PMIC).

The battery 189 may be configured to supply power to at least one element of the electronic device 101, and may include, for example, a primary cell which is not rechargeable, a secondary cell which is rechargeable, or a fuel cell.

The communication module 190 may support: establishing a wired communication channel or a wireless communication channel between the electronic device 101 and the external electronic device (e.g., the electronic device 102, the electronic device 104, or the server 108); and performing communication via the established communication channel. The communication module 190 may include one or more communication processors that: are operable independently of the processor 120 (e.g., the Application Processor (AP)); and support wired communication or a wireless communication. According to an embodiment, the communication module 190 may include a wireless communication module 192 (e.g., a cellular communication module, a short-range wireless communication module, or a Global Navigation Satellite System (GNSS) communication module) or a wired communication module 194 (e.g., a Local Area Network (LAN) communication module or a Power Line Communication (PLC) module). The electronic device 101 may use a corresponding one of the communication modules to communicate with the external electronic device via the first network 198 (e.g., a short-range communication network, such as Bluetooth™, Wi-Fi direct, or Infrared Data Association (IrDA)) or the second network 199 (e.g., a long-range communication network, such as a cellular network, the Internet, or a computer network (e.g., LAN or Wide Area Network (WAN)). The above-described various types of communication modules 190 may be implemented as a single chip, or may be implemented as chips separate from each other.

According to an embodiment, the wireless communication module 192 may distinguish, from another, and authenticate the electronic device 101 in a communication network by using a user's information stored in the subscriber identification module 196.

The antenna module 197 may include one or more antennas configured to transmit or receive a signal or power to or from the outside of the electronic device 101. According to an embodiment, the communication module 190 (e.g., the wireless communication module 192) may transmit or receive a signal to or from the external electronic device via an antenna appropriate for a communication scheme.

Some elements among the above-described elements may be mutually connected and exchange signals (e.g., commands or data) therebetween via an inter-peripheral communication scheme (e.g., a bus, General Purpose Input and Output (GPIO), Serial Peripheral Interface (SPI), or Mobile Industry Processor Interface (MIPI)).

According to an embodiment, commands or data may be transmitted or received between the electronic device 101 and the external electronic device 104 via the server 108 connected to the second network 199. Each of the electronic devices 102 and 104 may be a device of a type identical to, or different from, that of the electronic device 101. According to an embodiment, all or some of operations to be executed by the electronic device 101 may be executed by another or multiple external electronic devices. According to an embodiment, when the electronic device 101 should perform a function or a service automatically or at a request, the electronic device 101, instead of, or in addition to, executing the function or the service, may request the external electronic device for at least a partial function related to the function or service. The external electronic device having received the request may execute the requested function or an additional function, and deliver an execution result to the electronic device 101. The electronic device 101 may provide the requested function or service, with or without further processing of the received execution result. To that end, use may be made of, for example, cloud computing, distributed computing, or client-server computing technology.

Figure 2:
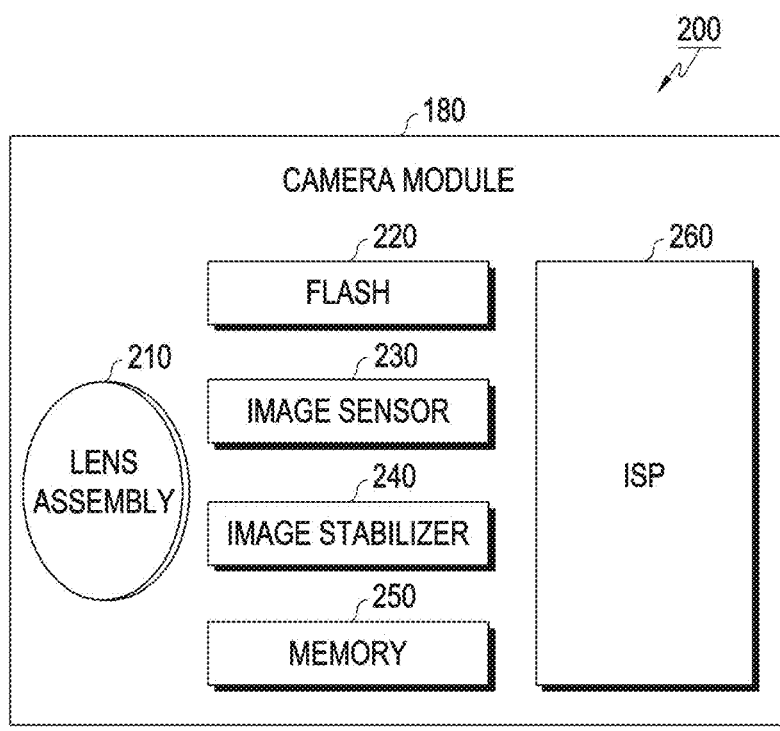
FIG. 2 is a block diagram illustrating a configuration of a camera module according to various embodiments.

FIG. 2 is a block diagram 200 illustrating a configuration of a camera module 180 according to various embodiments. Referring to FIG. 2, the camera module 180 may include a lens assembly 210, a flash 220, an image sensor 230, an image stabilizer 240, a memory 250 (e.g., a buffer memory), or an ISP 260. The lens assembly 210 may collect light emitted or reflected from an object, an image of which is to be captured. The lens assembly 210 may include one or more lenses. According to an embodiment, the camera module 180 may include multiple lens assemblies 210. In this example, the camera module 180 may be, for example, a dual camera, a 360-degree camera, or a spherical camera. The multiple lens assemblies 210 may have the same lens attribute (e.g., view angle, focal length, autofocus, f-number, or optical zoom), or at least one lens assembly may have at least one lens attribute different from that of another lens assembly. The lens assembly 210 may include, for example, a wide-angle lens or a telephoto lens. The flash 220 may emit light used to reinforce light reflected from an object. The flash 220 may include one or more Light-Emitting Diodes (LEDs) (e.g., a Red-Green-Blue (RGB) LED, a white LED, an Infrared (IR) LED, or an Ultraviolet (UV) LED) or a xenon lamp.

The image sensor 230 may acquire an image corresponding to the object by converting light, transmitted from the object via the lens assembly 210, into an electrical signal. According to an embodiment, the image sensor 230 may include: one image sensor selected from image sensors having different attributes, such as an RGB sensor, a Black-and-White (BW) sensor, an IR sensor, or a UV sensor; multiple image sensors having the same attribute; or multiple image sensors having different attributes. Each image sensor included in the image sensor 230 may be implemented by, for example, a Charged-Coupled Device (CCD) sensor or a Complementary Metal-Oxide-Semiconductor (CMOS) sensor.

In response to movement of the camera module 180 or the electronic device 101 including the camera module 180, the image stabilizer 240 may move the image sensor 230 or at least one lens included in the lens assembly 210 in a particular direction, or may control the same (e.g., adjust the read-out timing), in order to at least partially compensate for a negative effect (e.g., image blurring) due to the movement on an image being captured. According to an embodiment, the image stabilizer 240 may be implemented by, for example, an optical image stabilizer, and may detect the movement by using a gyro sensor (not illustrated) or an acceleration sensor (not illustrated) disposed inside or outside the camera module 180.

The memory 250 may store, at least temporarily, at least a part of an image acquired via the image sensor 230 for a subsequent image processing task. For example, when image acquisition is delayed due to shutter lag or multiple images are acquired at high speed, the acquired original image (e.g., a high-resolution image) may be stored in the memory 250, and its corresponding copy image (e.g., a low-resolution image) may be previewed on the display apparatus 160. Thereafter, if a specified condition is satisfied (e.g., by a user input or system command), at least a part of the original image stored in the memory 250 may be acquired and processed by, for example, the ISP 260. According to an embodiment, the memory 250 may be configured as at least a part of the memory 130 or as a separate memory that is operated independently of the memory 130.

The ISP 260 may perform image processing of an image acquired via the image sensor 230 or an image stored in the memory 250, wherein the image processing may be, for example, depth map generation, three-dimensional (3D) modeling, panorama generation, feature point extraction, image synthesis, or image compensation (e.g., noise reduction, resolution adjustment, luminance adjustment, blurring, sharpening, or softening). Additionally or alternatively, the ISP 260 may perform control (e.g., exposure time control or read-out timing control) over at least one (e.g., the image sensor 230) of the elements included in the camera module 180. An image processed by the ISP 260 may be stored back in the memory 250 for further processing, or may be delivered to an element (e.g., the memory 130, the display apparatus 160, the electronic device 102, the electronic device 104, or the server 108) external to the camera module 180. According to an embodiment, the ISP 260 may be configured as at least a part of the processor 120, or as a separate processor that is operated independently of the processor 120. When the ISP 260 is configured as a separate processor from the processor 120, images processed by the ISP 260 may be displayed by the processor 120 on the display apparatus 160 as they are or after being further image-processed.

According to an embodiment, the electronic device 101 may include at least two camera modules 180 having different attributes or functions. In an example of this configuration, at least one camera module 180 may be a wide-angle camera or a front camera, and at least another camera module 180 may be a telephoto camera or a rear camera.

Figure 3:
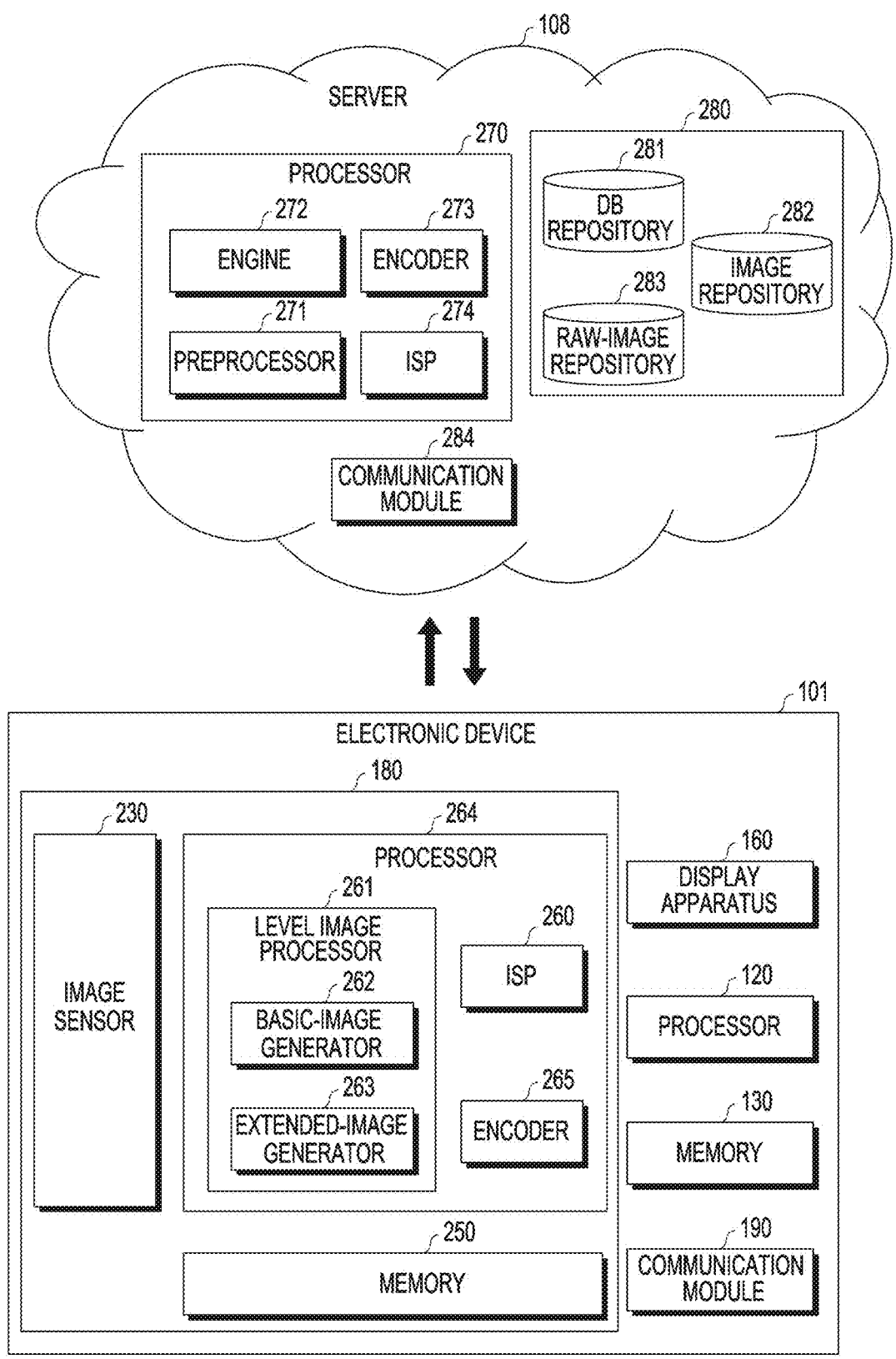
FIG. 3 is a diagram illustrating an example of a network configuration according to various embodiments of the disclosure.

FIG. 3 is a block diagram illustrating a configuration of each of an electronic device and a server according to various embodiments.

Referring to FIG. 3, according to various embodiments, the electronic device 101 may include a processor 264, a memory 130, a display apparatus 160, a camera module 180, and a communication module 190. The server 108 may include a processor 270, a memory 280, and a communication module 284. According to various embodiments, the camera module 180 may include an image sensor 230, a processor 264, and a memory 250. The processor 264 may include a level image processor 261, an ISP 260, and an encoder 265, and the level image processor 261 may include a basic-image generator 262 and an extended-image generator 263. Further, at least a part of the level image processor 261 may be included in the ISP 260 or the encoder 265.

The processor 270 of the server 108 may include a preprocessor 271, an engine 272, an encoder 273, and an ISP 274. The memory 280 may include a database repository 281, an image repository 282, and a raw-image repository 283.

According to various embodiments, the image sensor 230 may acquire raw images in various formats of an object to be captured. For example, the image sensor 230 may acquire raw images in various formats according to Color Filter Array (CFA) patterns. When the image sensor 230 includes a dual-pixel structure (or a Two-Photodiode (2 PD) structure), the image sensor 230 may acquire a raw image including different pieces of phase difference (or time difference) information in one pixel. Alternatively, the image sensor 230 may include multiple image sensors having an identical characteristic or different characteristics, and may include, for example, a dual sensor (e.g., RGB sensor+RGB sensor, RGB sensor+mono sensor, or wide-angle sensor+telephoto sensor) or an array sensor including multiple sensors. In this example, the image sensor 230 may acquire at least one raw image for one scene. The acquired raw image may be stored in the memory 130 or the memory 250 as it is or after being further processed.

According to various embodiments, the image sensor 230 may acquire raw images in various formats. For example, when a raw image has a Bayer format, for a pixel, the raw image may be expressed in one color among a red color, a green color, and a blue color, and may be expressed at a bit depth of 8 to 16 bits. For example, a CFA pattern may be applied to a raw image. The raw image may also have a layer structure including information on various colors (e.g., multiple colors among a red color, a green color, and a blue color) for one pixel. The image sensor 230 may also acquire a raw image including, for example, not only color information (RGB information) but also phase difference information. Metadata of information associated with image capturing (e.g., capturing time, capturing location, and illuminance) may be stored in relation to a raw image.

According to various embodiments, the processor 264 may perform various processes related to processing of a raw image received from the image sensor 230. The processor 264 may be implemented as one independent processor, or may be included in another processor (e.g., the processor 120). At least one of the lightweight image generator 262, the raw image compressor 263, the ISP 260, or the encoder 265 in the processor 264 may also be included in another processor (e.g., the processor 120). The processor 264 may be disposed on the inside of the camera module 180, may be disposed on the outside (e.g., the electronic device 101 or the server 108) thereof, or may be disposed on both the inside and outside thereof. A process performed by the processor 264 may be processed by the processor 264 alone, or may be distributed and processed by multiple processors.

According to various embodiments, the level image processor 261 may generate level images of multiple levels from a raw image acquired from the image sensor 230. For example, the basic-image generator 262 may generate a basic image having a size smaller than that of a raw image by using the raw image. Since a raw image may have a relatively large size, before the raw image is stored, processed, or transmitted, the basic-image generator 262 may generate a basic image having a size smaller than that of the raw image. For example, the basic-image generator 262 may perform various processings, including downscaling, down-sampling, compression, and the like, and thus may generate a basic image by using a raw image. Down-scaling may refer to, for example, processing for reducing the size or resolution of a raw image. Down-sampling may refer to, for example, an operation of selecting only one or some samples from among multiple sampled samples so as to generate a basic image. According to various embodiments, as described above, the basic image may include at least one piece of information among information on a low-resolution image having a reduced size or resolution compared to a raw image acquired by the camera, information on a low-frequency domain image of the raw image, and information on a higher bit-plane image of the raw image.

The extended-image generator 263 may generate an extended image including at least one of a high-resolution image having an extended size or resolution compared to the basic image, an image including higher frequency information than the basic-level image, or an image including lower bit-plane information than the basic-level image.

A raw image, a basic image, or an extended image may be compressed using various image compression algorithms, and a compression scheme is not limited.

As described with reference to FIG. 2, the ISP 260 may process an image acquired by the image sensor 230 or an image stored in the memory 250. The encoder 265 may encode a raw image, a basic image, or an extended image, and thus may generate an encoded image. An encoded image may have various formats, such as a JPEG format, a Moving Picture Experts Group (MPEG) format, and a 360-degree image format.

According to various embodiments, the memory 250 may temporarily or non-temporarily store at least one of a raw image, a basic image, an extended image, or an encoded image. The processor 120 may, for example, transmit at least one of a raw image, a basic image, an extended image, or a compressed image through the communication module 190 to the server 108.

The server 108 may receive at least one of a raw image, a basic image, an extended image, or a compressed image through the communication module 284. The communication module 284 may communicate with, for example, the communication module 190. The server 108 may perform: network management for the electronic device 101; service management related to a service, a right, and the like which can be provided to the electronic device 101; repository management related to the electronic device 101; and the like. A raw image may also be temporarily or non-temporarily stored in the raw-image repository 283 within the server 108.

According to various embodiments, the preprocessor 271 may perform processing required before a received basic image or a received extended image is delivered to the engine 272 or the ISP 274. For example, when a compressed basic image or a compressed extended image is received through the communication module 284, the preprocessor 271 may decompress the compressed basic image or the compressed extended image, and accordingly, may acquire a basic image or an extended image. The preprocessor 271 may also receive an extended image, encoded for each region, through the communication module 284. The preprocessor 271 may perform at least one task among application of an image quality improvement algorithm, demosaic processing, or an image format change, on an extended image which has been acquired through decompression or has been received.

According to various embodiments, the engine 272 may analyze a basic image (or an image file), and thus may perform various tasks (e.g., object recognition, velocity vector determination, face recognition, segmentation, scene parsing, and texture recognition). The engine 272 may use various algorithms for performing the above-described various tasks. The server 108 according to various embodiments may have relatively powerful calculation capability, a relatively large storage size, a large amount of resources, and thus may use an algorithm requiring a large amount of calculation and may also use a newly-developed algorithm. As a result of the execution of the various tasks, the engine 272 may generate, store, or transmit correction region information (e.g., an object recognition result, a velocity vector, a face recognition result, a segmentation result, a scene category, and information on texture) which can be used by the ISP 274. The engine 272 may generate multiple pieces of correction region information in a layer format. The correction region information generated by the engine 272 will be described in more detail below.

According to various embodiments, the ISP 274 may perform various image processings on an extended image received from the electronic device 101. In another embodiment, the electronic device 101 may receive correction region information, and may process an image by using the same. In this example, the electronic device 101 may multiply perform image processing, provided by the ISP 260, and image processing utilizing the correction region information. The electronic device 101 may temporarily or non-temporarily store an image, obtained by performing image processing, in the memory 130 or may display the same on the display apparatus 160. As described above, when the ISP 274 performs image processing, the ISP 274 may perform image processing based on correction region information. The ISP 274 may receive, from the DB repository 281, additional information (e.g., a feature vector) corresponding to correction region information, and may use the same for image processing. The DB repository 281 may store various pieces of feature information corresponding to an image category and the like. The processed image may be retransmitted to the electronic device 101, or may be stored in the image repository 282 within the server 108. The ISP 274 may perform, at least based on correction region information, various processings such as white balance adjustment, color adjustment (e.g., color matrix, color correction, or color enhancement), color filter array interpolation, noise reduction processing or sharpening, and image enhancement (e.g., HDR or face detection). In addition, the ISP 274 may perform image processing requiring a large amount of calculation, such as original color mapping, detail regeneration, text reconstruction, or image inpainting.

According to various embodiments, the processor 270 may perform second image processing on an extended image processed by the preprocessor 271, and the second image processing may be different from first image processing performed by the ISP 260 of the electronic device 101.

The second image processing may be, for example, image processing which can be performed at least based on correction region information from the engine 272, and may be image processing requiring a larger amount of calculation or a larger amount of resources than the first image processing. For example, a second-image-processed image may be an image which is correction-processed at a higher level than that of a first-image-processed image.

In various embodiments of the disclosure, each function unit or module may refer to a functional or structural combination of hardware for performing the technical idea of the disclosure and software for driving the hardware. For example, those skilled in the art, to which the disclosure pertains, could easily understand that the each function unit or module may refer to a predetermined code and a logical unit of a hardware resource for executing the predetermined code and does not necessarily mean either a physically connected code or one kind of hardware.

An electronic device according to one of various embodiments of the disclosure may include a camera, a communication module, a display, and a processor, wherein the processor is configured to: acquire a raw image corresponding to an external object by using the camera; generate a first-level image having a first attribute and a second-level image having a second attribute, by using the raw image; transmit a first image obtained by encoding at least a part of the first-level image to an external electronic device by using the communication module so that the external electronic device generates analysis information of the first image; generate a second image by encoding at least a part of the second-level image at least based on the analysis information; and transmit the second image to the external electronic device by using the communication module.

According to various embodiments of the disclosure, the processor may be configured to: generate first-processed data from the raw image by using a first image processing scheme; receive, from the external electronic device, second-processed data generated at least from the second image by using a second image processing scheme; and synthesize the first-processed data and the second-processed data.

According to various embodiments of the disclosure, the processor may be configured to: further generate a third image by encoding at least another part of the second-level image at least based on the analysis information; determine a priority between the second image and the third image at least based on the analysis information; and transmit the second image and the third image to the external electronic device according to an order determined at least based on the priority.

According to various embodiments of the disclosure, the first-level image may include at least one piece of information among information on a low-resolution image having a reduced size or resolution compared to a raw image acquired by the camera, information on a low-frequency domain image of the raw image, and information on a higher bit-plane image of the raw image.

According to various embodiments of the disclosure, the second-level image may include at least one of a high-resolution image having an extended size or resolution compared to the first-level image, an image including higher frequency information than the first-level image, or an image including lower bit-plane information than the first-level image.

According to various embodiments of the disclosure, the analysis information may include attribute information of each of multiple regions included in the first image.

According to various embodiments of the disclosure, the analysis information may include a compression ratio which is based on an importance level of each of the multiple regions according to an analysis result of the multiple regions.

According to various embodiments of the disclosure, the processor may be configured to: sequentially receive multiple second-processed data, generated at least from the second image by using a second image processing scheme, from the external electronic device according to priorities; and synthesize the second-processed data and the first-processed data according to a reception order of the multiple second-processed data.

An electronic device according to one of various embodiments of the disclosure may include a communication module and a processor, wherein the processor is configured to: receive a first image, obtained by encoding a first-level image having a first attribute and generated from a raw image acquired by a camera, from an external electronic device by using the communication module; decode the received first image; generate analysis information by analyzing the decoded first image; transmit the generated analysis information to the external electronic device; receive a second image, obtained by encoding a second-level image having a second attribute and generated from the raw image based on the analysis information, from the external electronic device; and generate a synthesized image by merging the decoded first image and the received second image.

According to various embodiments of the disclosure, the analysis information may include a compression ratio which is based on an importance level of each of the multiple regions according to an analysis result of the multiple regions.

Figure 4:
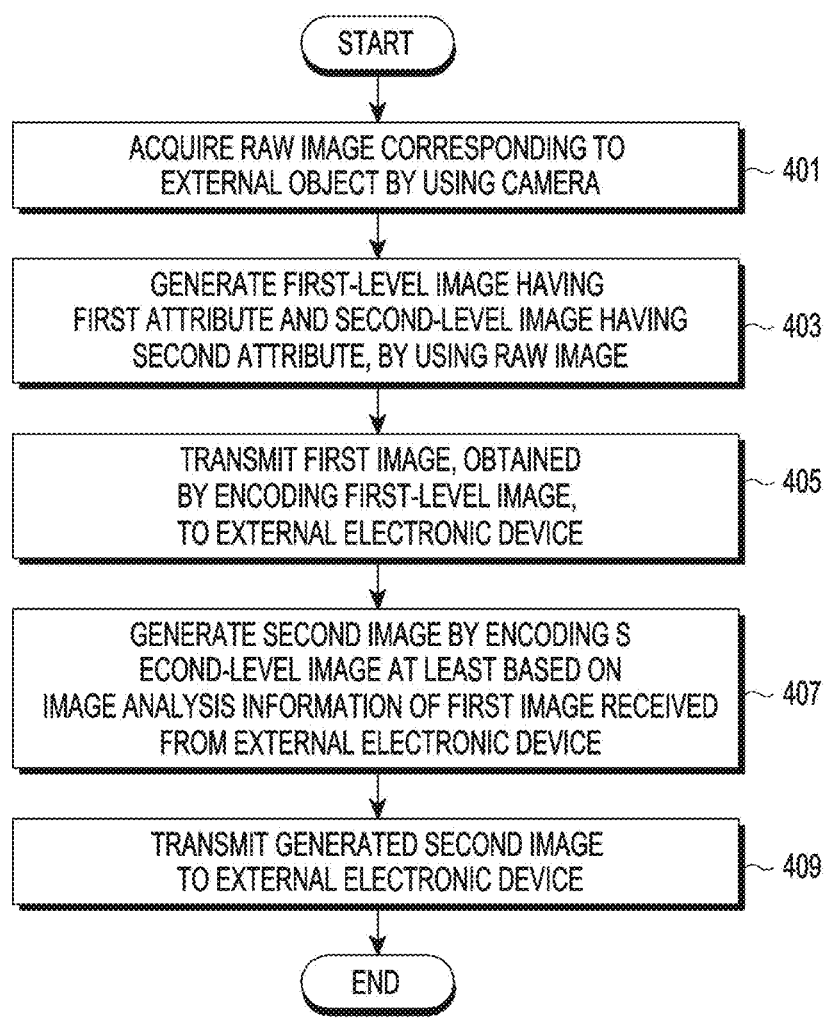
FIG. 4 is a flowchart illustrating a procedure for processing image data by an electronic device according to various embodiments of the disclosure.

FIG. 4 is a flowchart illustrating a procedure for processing image data by an electronic device according to various embodiments of the disclosure. Referring to FIG. 4, in operation 401, the electronic device 101 (e.g., the processor 120 or the processor 264) may acquire a raw image corresponding to an external object by using the camera 180.

In operation 403, by using the raw image, the electronic device may generate a first-level image (a basic image) having a first attribute and a second-level image (an extended image) having a second attribute.

In operation 405, the electronic device may transmit a first image, obtained by encoding the first-level image, to an external electronic device (e.g., the server 108 of FIG. 1 or the server 108 of FIG. 3).

In operation 407, the electronic device may generate a second image by encoding the second-level image at least based on image analysis information of the first image received from the external electronic device.

In operation 409, the electronic device may transmit the generated second image to the external electronic device.

According to various embodiments of the disclosure, at least one operation may be omitted from the operations illustrated in FIG. 4, and the remaining operations except for the at least one omitted operation may be executed. Alternatively, at least another operation may be added between the operations illustrated in FIG. 4. Further, the operations illustrated in FIG. 4 may be executed in the order illustrated in FIG. 4, or places are switched with each other in the order of execution of at least one operation and another operation, and the at least one operation and the another operation are executed in the changed order. Further, the operations illustrated in FIG. 4 may be performed by the electronic device or the server. Alternatively, at least one operation among the operations illustrated in FIG. 4 may be performed by the electronic device, and the remaining operations may be performed by the server.

A method for processing image data by an electronic device according to one of various embodiments of the disclosure may include: acquiring a raw image corresponding to an external object by using a camera; generating a first-level image having a first attribute and a second-level image having a second attribute, by using the raw image; transmitting a first image obtained by encoding at least a part of the first-level image to an external electronic device so that the external electronic device generates analysis information of the first image; generating a second image by encoding at least a part of the second-level image at least based on the analysis information; and transmitting the second image to the external electronic device.

According to various embodiments of the disclosure, the method may include: generating first-processed data from the raw image by using a first image processing scheme; receiving, from the external electronic device, second-processed data generated at least from the second image by using a second image processing scheme; and synthesizing the first-processed data and the second-processed data.

According to various embodiments of the disclosure, the method may include: generating a third image by encoding at least another part of the second-level image at least based on the analysis information; determining a priority between the second image and the third image at least based on the analysis information; and transmitting the second image and the third image to the external electronic device according to an order determined at least based on the priority.

According to various embodiments of the disclosure, the first-level image may include at least one piece of information among information on a low-resolution image having a reduced size or resolution compared to a raw image acquired by the camera, information on a low-frequency domain image of the raw image, and information on a higher bit-plane image of the raw image.

According to various embodiments of the disclosure, the second-level image may include at least one of a high-resolution image having an extended size or resolution compared to the first-level image, an image including higher frequency information than the first-level image, or an image including lower bit-plane information than the first-level image.

According to various embodiments of the disclosure, the analysis information may include attribute information of each of multiple regions included in the first image.

According to various embodiments of the disclosure, the analysis information may include a compression ratio which is based on an importance level of each of the multiple regions according to an analysis result of the multiple regions.

According to various embodiments of the disclosure, the method may include: sequentially receiving multiple second-processed data, generated at least from the second image by using a second image processing scheme, according to priorities; and synthesizing the second-processed data and the first-processed data according to a reception order of the multiple second-processed data.

A method for processing image data by an electronic device according to one of various embodiments of the disclosure may include: receiving a first image, obtained by encoding a first-level image having a first attribute and generated from a raw image acquired by a camera, from an external electronic device; decoding the received first image; generating analysis information by analyzing the decoded first image; transmitting the generated analysis information to the external electronic device; receiving a second image, obtained by encoding a second-level image having a second attribute and generated from the raw image based on the analysis information, from the external electronic device; and generating a synthesized image by merging the decoded first image and the received second image.

According to various embodiments of the disclosure, the analysis information may include a compression ratio which is based on an importance level of each of the multiple regions according to an analysis result of the multiple regions.

Hereinafter, in the disclosure, various embodiments for processing, by an electronic device, an image by using a basic image and an extended image generated from a raw image will be described in detail with reference to FIG. 5 to FIG. 24.

Figure 5:
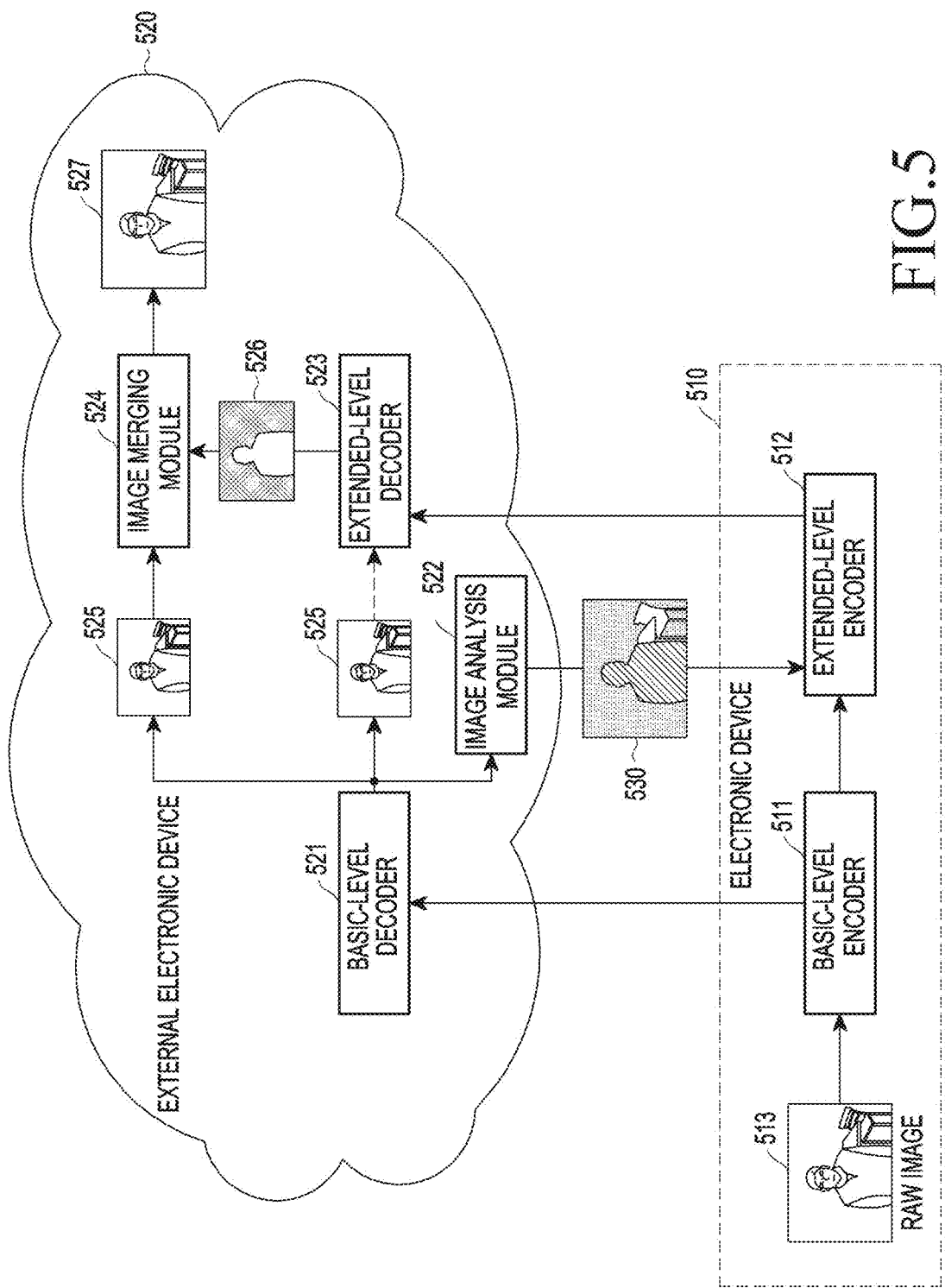
FIG. 5 is a diagram illustrating an example of a network configuration illustrating an example in which each of an electronic device and an external electronic device processes image data according to various embodiments of the disclosure.

FIG. 5 is a diagram illustrating an example of a network configuration illustrating an example in which each of an electronic device and an external electronic device processes image data according to various embodiments of the disclosure. Referring to FIG. 5, the electronic device 510 (e.g., the electronic device 101 of FIG. 1 or the electronic device 101 of FIG. 3) may include a basic-level encoder 511 or an extended-level encoder 512.

The basic-level encoder 511 may encode a basic-level image or a basic image from a raw image 513, acquired by a camera, according to a designated scheme. The extended-level encoder 512 may encode an extended image acquired by the camera, or may encode an extended image based on an encoded basic image output from the basic-level encoder 511.

The basic image encoded by the basic-level encoder 511 may be transmitted to the external electronic device (e.g., the server 108 of FIG. 1 or the server 108 of FIG. 3). A basic-level decoder 521 of the external electronic device 520 may decode the encoded basic image received from the electronic device 510, and thus may reconstruct a basic image 525.

An image analysis module 522 of the external electronic device 520 may perform image analysis of the reconstructed basic image. For example, the image analysis module 522 may perform image analysis of the basic image, and thus may divide the basic image into multiple regions according to importance levels. According to various embodiments, the image analysis module 522 may recognize the basic image, and thus may output, for example, an image analysis result illustrated in FIG. 18 through classification and segmentation of particular objects. Based on the image analysis result, the image analysis module 522 may distinguish regions from each other in consideration of pieces of information, including a previously-selected object, expression of surface texture, and the like, and may request additional data different according to the respective regions. According to various embodiments, when the amount of additional data of each region is determined, analysis may be performed based on a human visual system, and thus may distinguish among a part on which a person's eye gaze is concentrated, a part which is not sensitive to an error occurring during compression, and the like, and thus may configure an image characteristic map for requesting additional information of each region, as an additional layer in an image analysis result. According to various embodiments, region units of the image characteristic map may be divided into units of block, region, and pixel, and may be configured as multiple layers to be transmitted.

According to various embodiments, an order of transmissions of the distinguished multiple regions may be determined according to the importance levels, and the distinguished multiple regions may have compression ratios determined according to the importance levels. This configuration will be described in detail below.

Image analysis information 530 (or image characteristic map information) obtained through analysis by the image analysis module 522 may be transmitted to the electronic device 510. The extended-level encoder 512 of the electronic device 510 may encode an extended image by using image analysis information transmitted by the external electronic device 520. For example, according to various embodiments, the extended-level encoder 512 may divide the extended image into multiple regions according to the image analysis information, and may perform encodings according to the respective divided regions based on the encoding order, encoding compression ratios, or the like configured for the regions. According to various embodiments, the extended-level encoder 512 may configure the extended image as at least one layer and may encode the extended image configured as at least one layer, by using an encoding result from the basic-level encoder 511 and image analysis information (e.g., an image characteristic map) delivered by the image analysis module 522. According to various embodiments, the number of layers configured for the extended image, and constituent data of each layer or the amount of information thereof may be determined in consideration of a configuration of the received image characteristic map or an environment of a communication network.

According to various embodiments, an encoded extended image delivered by the extended-level encoder 512 may be implemented below according to a method for implementing scalability.

1. Resolution scalability: additional data for increasing a resolution of an original image;
2. Frequency scalability: a high frequency for reconstructing an original image; and
3. Bit-plane scalability: a lower bit plane for reconstructing an original image.

The extended image encoded by the extended-level encoder 512 may be transmitted to the external electronic device 520. According to various embodiments, the encoded extended image may be sequentially transmitted to the external electronic device 520 according to the divided regions. According to various embodiments, the encoded extended image may be transmitted in descending order of importance level among the multiple regions divided from the encoded extended image. Specific embodiments of this configuration will be described below.

An extended-level decoder 523 of the external electronic device 520 may decode an encoded extended image received from the electronic device 510. According to various embodiments, when the extended-level decoder 523 decodes the received encoded extended image, the extended-level decoder 523 may perform decoding by using a basic image decoded by the basic-level decoder 521.

An image merging module 524 of the external electronic device 520 may merge an extended image 526 decoded by the extended-level decoder 523 and a basic image decoded by the basic-level decoder 521, and thus may generate a synthesized image 527.

Hereinafter, in the disclosure various embodiments for generating a basic image (or a basic-level image) and an extended image (or an extended-level image) from a raw image will be described with reference to FIG. 6 to FIG. 10.

Figure 6:
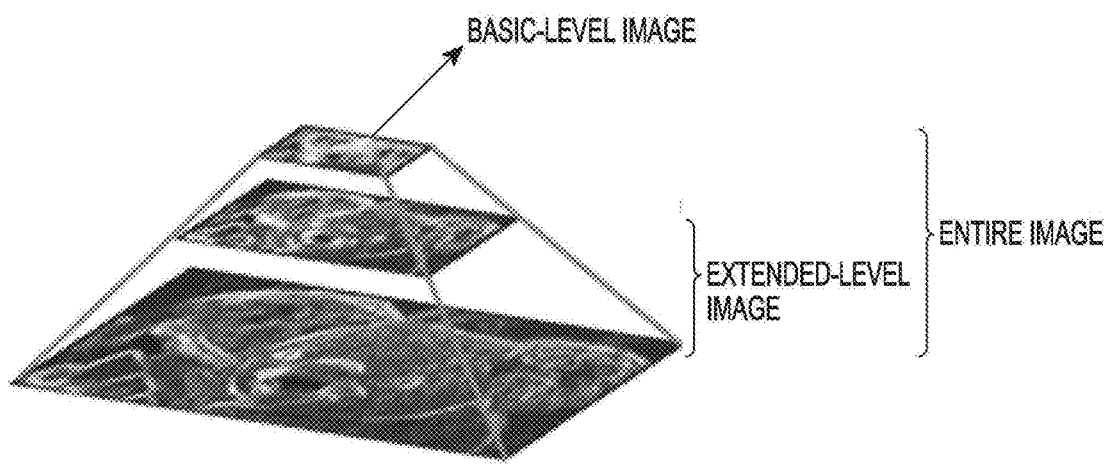
FIG. 6 is a diagram illustrating a concept of a basic-level image and an extended-level image according to various embodiments of the disclosure.
Figure 7:
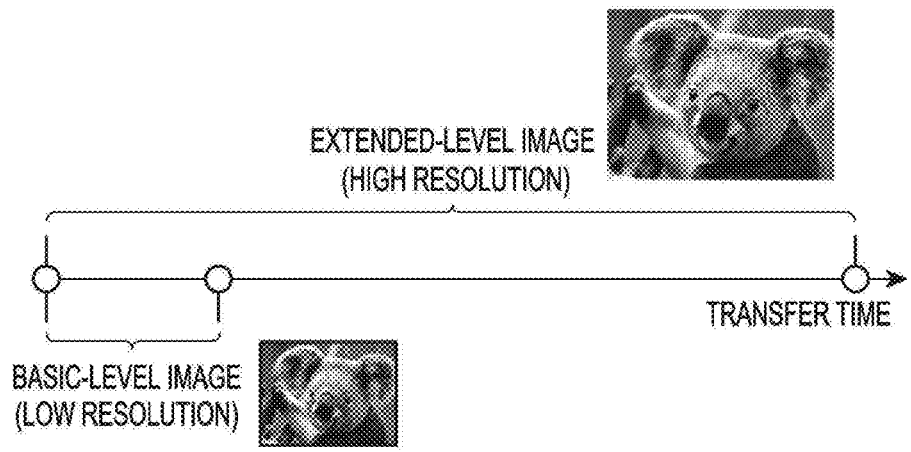
FIG. 7 is a diagram illustrating a concept of a basic-level image and an extended-level image according to various embodiments of the disclosure.

FIG. 6 is a diagram illustrating a concept of a basic-level image and an extended-level image according to various embodiments of the disclosure. Referring to FIG. 6, the electronic device 101 (e.g., the processor 120) may generate a basic image by using downsampling or downscaling for reducing a resolution of a raw image. The electronic device 101 may upscale a basic image to the size of a resolution of a raw image, and may generate an extended image from the difference between the upscaled image and the original raw image. As illustrated in FIG. 7, a raw image may have a transfer time longer than that of a basic image.

Figure 8:
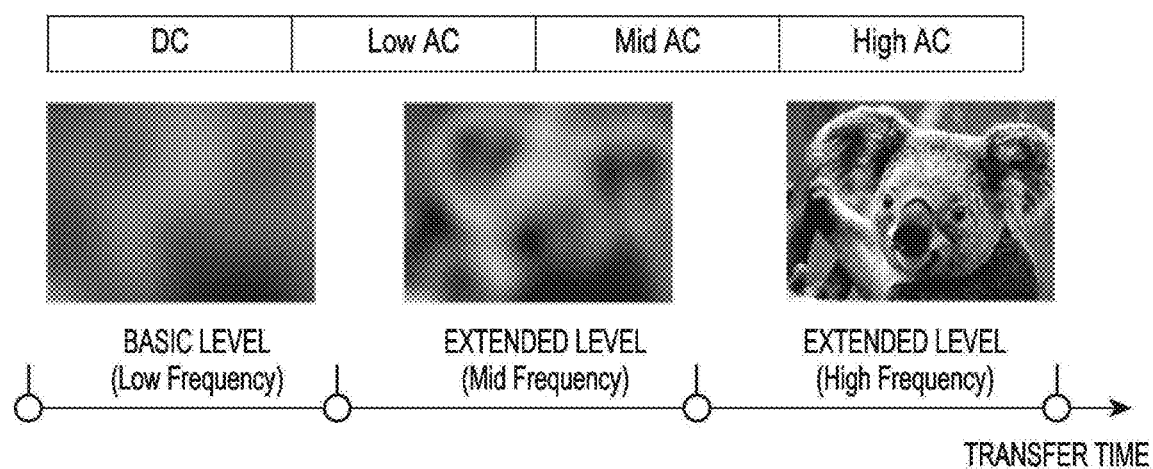
FIG. 8 is a diagram illustrating a concept of a basic-level image and an extended-level image according to various embodiments of the disclosure.

Referring to FIG. 8, the electronic device 101 (e.g., the processor 120) may transform an original raw image by using a Discrete Cosine Transform (DCT), a wavelet transform, or the like, and then may generate a basic image from a low-frequency component. The electronic device 101 may generate an extended image from a high-frequency component. A basic image may have a transfer time longer than, for example, that of an extended image, but this configuration is only an example.

Figure 9:
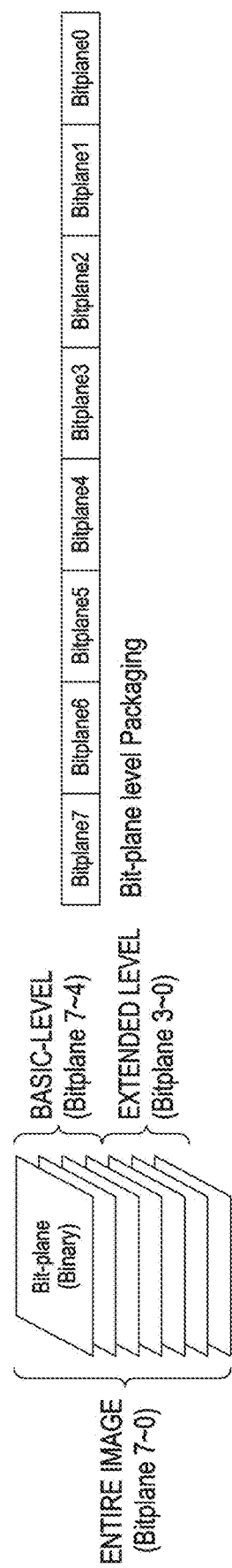
FIG. 9 is a diagram illustrating a concept of a basic-level image and an extended-level image according to various embodiments of the disclosure.
Figure 10:
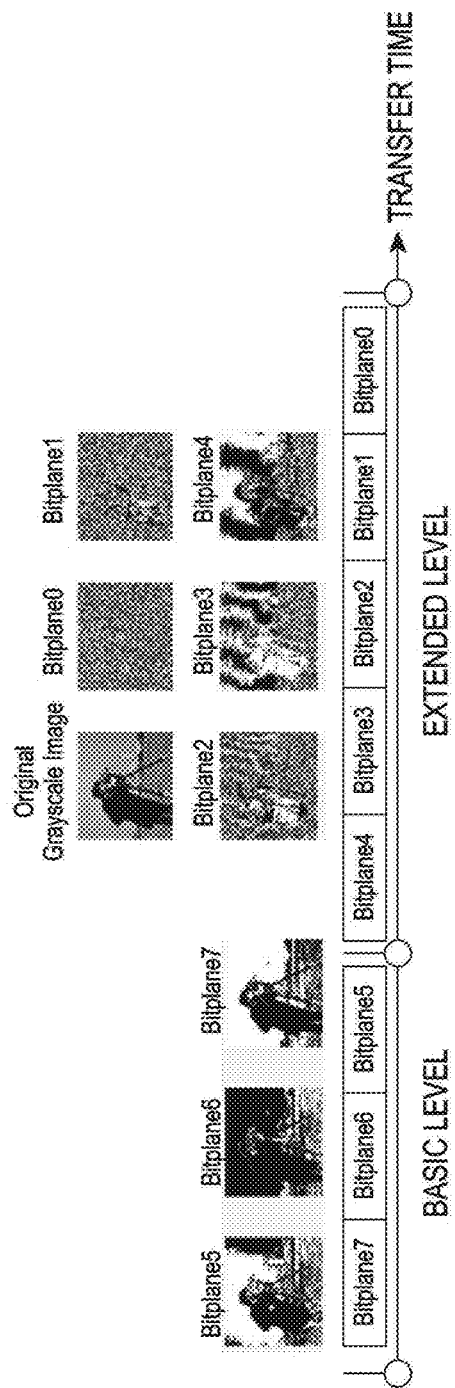
FIG. 10 is a diagram illustrating a concept of a basic-level image and an extended-level image according to various embodiments of the disclosure.

Referring to FIG. 9, the electronic device 101 (e.g., the processor 120) may generate a basic image by using bit planes (e.g., bit plane 7 to bit plane 4) corresponding to high-order bits or MSBs in the entire bit depth of an example of an original raw image (e.g., an entire image). The electronic device may generate an extended image by using bit planes (e.g., bit plane 0 to bit plane 3) corresponding to low-order bits or Least Significant Bits (LSBs) in the entire bit depth of the original raw image. Referring to FIG. 10, a basic image may have a transfer time shorter than, for example, that of an extended image, but this configuration is only an example.

Figure 11:
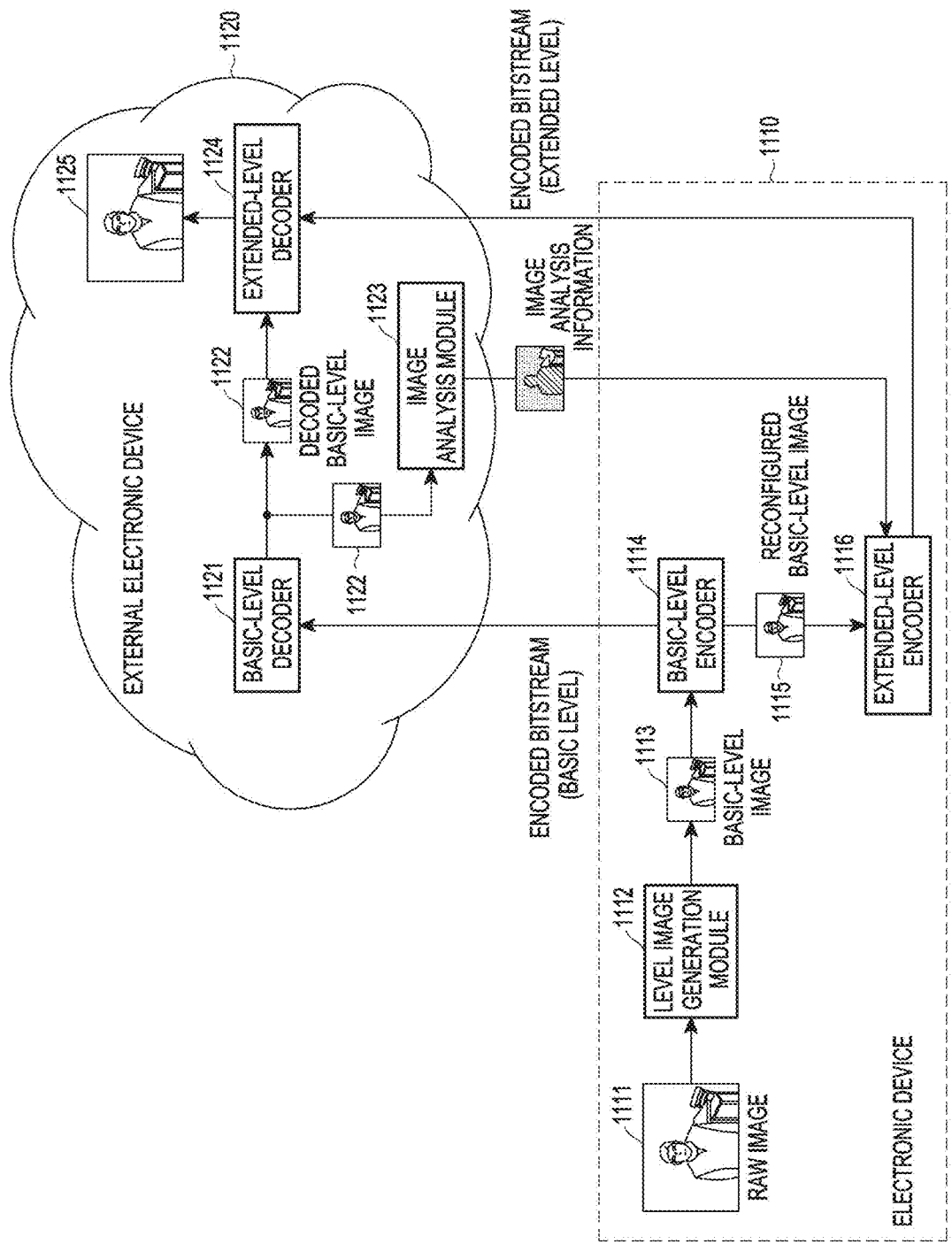
FIG. 11 is a diagram illustrating an example of a network configuration illustrating an example in which each of an electronic device and an external electronic device processes image data according to various embodiments of the disclosure.

FIG. 11 is a diagram illustrating an example of a network configuration illustrating an example in which each of an electronic device and an external electronic device processes image data according to various embodiments of the disclosure. Referring to FIG. 11, the electronic device 1110 (e.g., the electronic device 101 of FIG. 1 or the electronic device 101 of FIG. 3) may include a level image generation module 1112, a basic-level encoder 1114, or an extended-level encoder 1116.

The level image generation module 1112 may generate a basic image 1113 (or a basic-level image) from a raw image 1111. Examples of a method for generating the basic image 1113 by the level image generation module 1112 may include the various methods as illustrated in FIG. 6 to FIG. 10.

The basic-level encoder 1114 may encode the basic image 1113, generated by the level image generation module 1112, according to a designated scheme. For example, the basic-level encoder 1114 may perform encoding according to a run-length encoding scheme and the like.

The extended-level encoder 1116 may encode an extended image based on an encoded basic image output from the basic-level encoder 1114.

The basic image encoded by the basic-level encoder 1114 may be transmitted to an external electronic device 1120 (e.g., the server 108 of FIG. 1 or the server 108 of FIG. 3). A basic-level decoder 1121 of the external electronic device 1120 may decode the encoded basic image received from the electronic device 1110, and thus may reconstruct a basic image 1122.

An image analysis module 1123 of the external electronic device 1120 may perform image analysis of the reconstructed basic image 1122. For example, the image analysis module 1123 may perform image analysis of the basic image, and thus may divide the basic image into multiple regions according to importance levels. According to various embodiments, the image analysis module 1123 may recognize the basic image, and thus may output, for example, an image analysis result illustrated in FIG. 18 through classification and segmentation of particular objects. Based on the image analysis result, the image analysis module 522 may distinguish regions from each other in consideration of pieces of information, including a previously-selected object, expression of surface texture, and the like, and may request additional data different according to the respective regions. According to various embodiments, when the amount of additional data of each region is determined, analysis may be performed based on a human visual system, and thus may distinguish among a part on which a person's eye gaze is concentrated, a part which is not sensitive to an error occurring during compression, and the like, and thus may configure an image characteristic map for requesting additional information of each region, as an additional layer in an image analysis result. According to various embodiments, region units of the image characteristic map may be divided into units of block, region, and pixel, and may be configured as multiple layers to be transmitted.

According to various embodiments, an order of transmissions of the distinguished multiple regions may be determined according to the importance levels, and the distinguished multiple regions may have compression ratios determined according to the importance levels. This configuration will be described in detail below.

Image analysis information (or image characteristic map information) obtained through analysis by the image analysis module 1123 may be transmitted to the electronic device 1110. The extended-level encoder 1116 of the electronic device 1110 may encode an extended image by using image analysis information transmitted by the external electronic device 1120. For example, according to various embodiments, the extended-level encoder 1116 may divide the extended image into multiple regions according to the image analysis information, and may perform encodings according to the respective divided regions based on the encoding order, encoding compression ratios, or the like configured for the regions. According to various embodiments, the extended-level encoder 1116 may configure the extended image as at least one layer and may encode the extended image configured as at least one layer, by using an encoding result from the basic-level encoder 1114 and image analysis information (e.g., an image characteristic map) delivered by the image analysis module 1123. According to various embodiments, the number of layers configured for the extended image, and constituent data of each layer or the amount of information thereof may be determined in consideration of a configuration of the received image characteristic map or an environment of a communication network. According to various embodiments, an encoded extended image delivered by the extended-level encoder 1116 may be implemented as illustrated in FIG. 11 according to resolution scalability.

The extended image encoded by the extended-level encoder 1116 may be transmitted to the external electronic device 1120. According to various embodiments, the encoded extended image may be sequentially transmitted to the external electronic device 1120 according to the divided regions. According to various embodiments, the encoded extended image may be transmitted in descending order of importance level among the multiple regions divided from the encoded extended image. Specific embodiments of this configuration will be described below.

An extended-level decoder 1124 of the external electronic device 1120 may decode an encoded extended image received from the electronic device 1110. According to various embodiments, when the extended-level decoder 1124 decodes the received encoded extended image, the extended-level decoder 1124 may perform decoding by using a basic image 1122 decoded by the basic-level decoder 1121.

Figure 12:
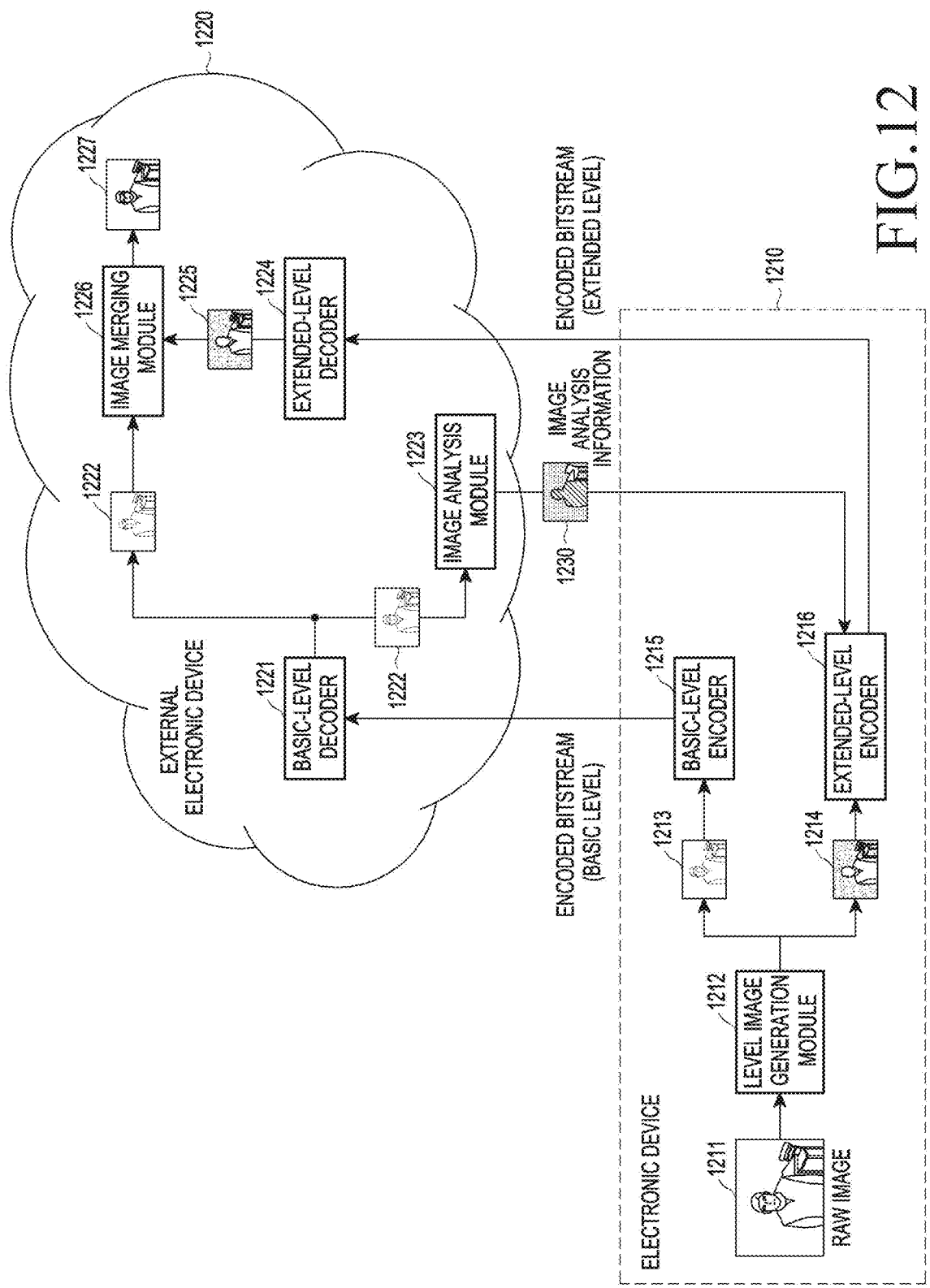
FIG. 12 is a diagram illustrating an example of a network configuration illustrating an example in which each of an electronic device and an external electronic device processes image data according to various embodiments of the disclosure.

FIG. 12 is a diagram illustrating an example of a network configuration illustrating an example in which each of an electronic device and an external electronic device processes image data according to various embodiments of the disclosure. Referring to FIG. 12, the electronic device 1210 (e.g., the electronic device 101 of FIG. 1 or the electronic device 101 of FIG. 3) may include a level image generation module 1212, a basic-level encoder 1215, or an extended-level encoder 1216.

The level image generation module 1212 may generate a basic image 1213 (or a basic-level image) from a raw image 1211. Examples of a method for generating the basic image 1213 by the level image generation module 1212 may include the various methods as illustrated in FIG. 6 to FIG. 10.

The basic-level encoder 1215 may encode the basic image 1213, generated by the level image generation module 1212, according to a designated scheme. For example, the basic-level encoder 1215 may perform encoding according to a run-length encoding scheme and the like.

The extended-level encoder 1216 may encode an extended image output from the layer image generation module 1212.

The basic image encoded by the basic-level encoder 1215 may be transmitted to an external electronic device 1220 (e.g., the server 108 of FIG. 1 or the server 108 of FIG. 3). A basic-level decoder 1221 of the external electronic device 1220 may decode the encoded basic image received from the electronic device 1210, and thus may reconstruct a basic image 1222.

An image analysis module 1223 of the external electronic device 1220 may perform image analysis of the reconstructed basic image 1222. For example, the image analysis module 1223 may perform image analysis of the basic image, and thus may divide the basic image into multiple regions according to importance levels. According to various embodiments, the image analysis module 1223 may recognize the basic image, and thus may output, for example, an image analysis result illustrated in FIG. 18 through classification and segmentation of particular objects. Based on the image analysis result, the image analysis module 522 may distinguish regions from each other in consideration of pieces of information, including a previously-selected object, expression of surface texture, and the like, and may request additional data different according to the respective regions. According to various embodiments, when the amount of additional data of each region is determined, analysis may be performed based on a human visual system, and thus may distinguish among a part on which a person's eye gaze is concentrated, a part which is not sensitive to an error occurring during compression, and the like, and thus may configure an image characteristic map for requesting additional information of each region, as an additional layer in an image analysis result. According to various embodiments, region units of the image characteristic map may be divided into units of block, region, and pixel, and may be configured as multiple layers to be transmitted.

According to various embodiments, an order of transmissions of the distinguished multiple regions may be determined according to the importance levels, and the distinguished multiple regions may have compression ratios determined according to the importance levels. This configuration will be described in detail below.

Image analysis information (or image characteristic map information) obtained through analysis by the image analysis module 1223 may be transmitted to the electronic device 1210. The extended-level encoder 1216 of the electronic device 1210 may encode an extended image by using image analysis information transmitted by the external electronic device 1220. For example, according to various embodiments, the extended-level encoder 1216 may divide the extended image into multiple regions according to the image analysis information, and may perform encodings according to the respective divided regions based on the encoding order, encoding compression ratios, or the like configured for the regions. According to various embodiments, the number of layers configured for the extended image, and constituent data of each layer or the amount of information thereof may be determined in consideration of a configuration of the received image characteristic map or an environment of a communication network. According to various embodiments, an encoded extended image delivered by the extended-level encoder 1216 may be implemented as illustrated in FIG. 12 according to bit-plane scalability.

The extended image encoded by the extended-level encoder 1216 may be transmitted to the external electronic device 1220. According to various embodiments, the encoded extended image may be sequentially transmitted to the external electronic device 1220 according to the divided regions. According to various embodiments, the encoded extended image may be transmitted in descending order of importance level among the multiple regions divided from the encoded extended image. Specific embodiments of this configuration will be described below.

An extended-level decoder 1224 of the external electronic device 1220 may decode an encoded extended image received from the electronic device 1210.

An image merging module 1226 of the external electronic device 1220 may merge an extended image 1225 decoded by the extended-level decoder 1224 and a basic image 1222 decoded by the basic-level decoder 1221, and thus may generate a synthesized image 1227.

Figure 13:
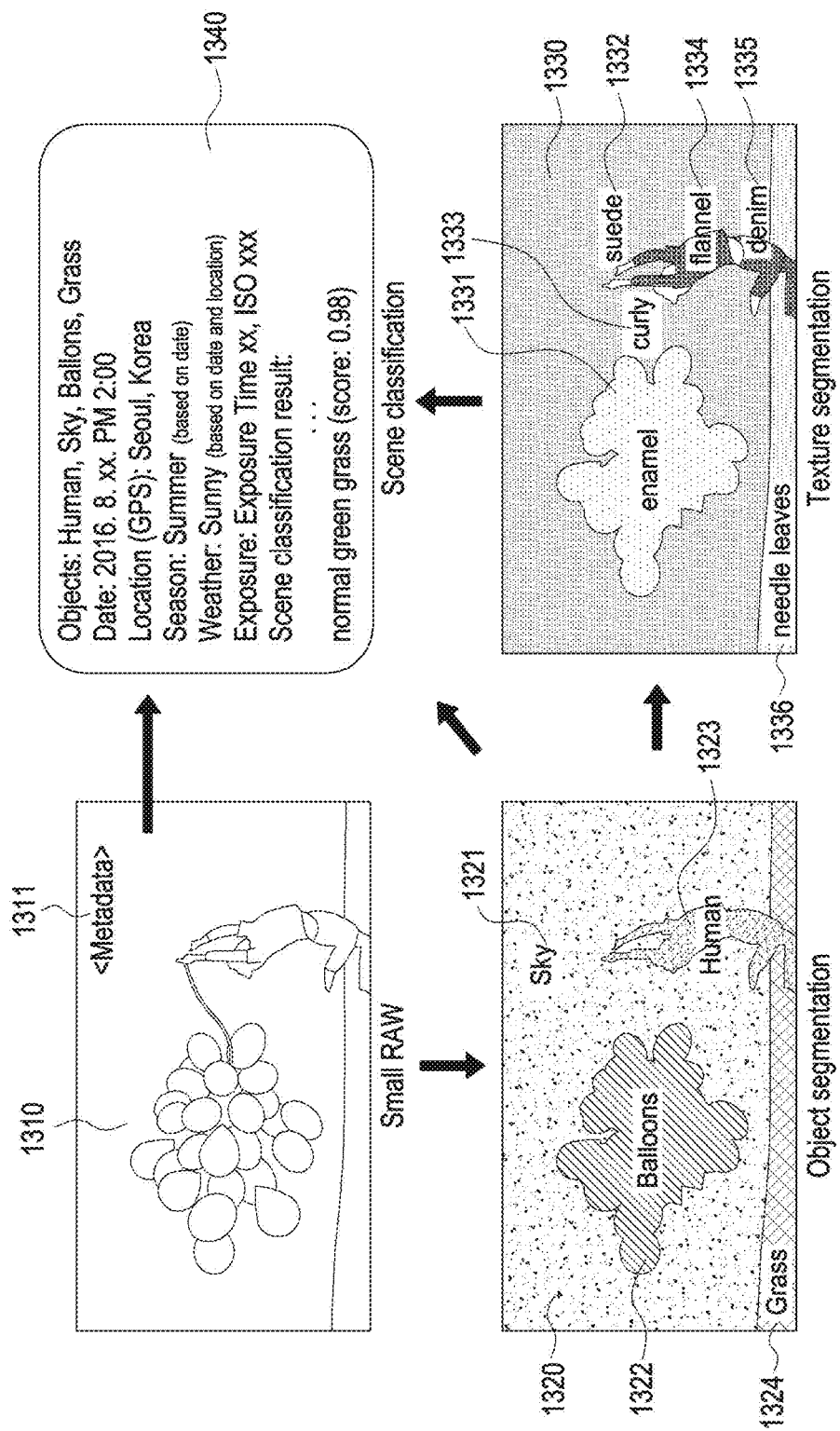
FIG. 13 is a diagram illustrating an example of analysis of image data by an external electronic device according to various embodiments of the disclosure.

FIG. 13 is a diagram illustrating an example of analysis of image data by an external electronic device according to various embodiments of the disclosure. For example, a basic image 1310 illustrated in FIG. 13 may be acquired through a communication interface or a communication module of an external electronic device (e.g., the external electronic device 520, i.e., the external electronic device 1120 of FIG. 11 or the external electronic device 1220 of FIG. 12). The basic image 1310 may be an image obtained by downscaling or downsampling a raw image acquired by the electronic device 101 through an image sensor. The external electronic device may acquire, for example, the basic image 1310. The external electronic device may additionally receive metadata 1311 of the basic image 1310. The metadata 1311 may include focal length, auto focus area, left/right rotation-related information (orientation) during capturing, color space, exposure time, aperture-related information (f-number), exposure program (e.g., auto, aperture priority, shutter priority, or manual), ISO speed ratings, image capturing date (data time original), or the like. Alternatively, although not illustrated, the metadata 1311 may also include information, such as image capturing location or illuminance at a time point of capturing, sensed by a sensor except for an image sensor.

The external electronic device may perform object segmentation and recognition on the basic image 1310. An object may refer to each of regions divided by segmentation in the basic image 1310, and may be referred to as an "image region". For example, the external electronic device may acquire a segmentation map 1320 illustrated in FIG. 13. The external electronic device may distinguish among objects 1321, 1322, 1323, and 1324 in the basic image 1310 based on various features, including an edge, a blob, and the like. The external electronic device may apply a recognition algorithm to each of the objects 1321, 1322, 1323, and 1324, and thus may acquire a recognition result. For example, the external electronic device may acquire a recognition result of the objects 1321, 1322, 1323, and 1324 by using a recognition algorithm acquired by applying machine learning or deep learning to a large amount of database. The external electronic device may acquire a recognition result indicating that the first object 1321 is sky, the second object 1322 is balloons, the third object 1323 is a human, and the fourth object 1324 is grass. The external electronic device may acquire a segmentation map 1320 including position information (or pixel coordination information) of the objects 1321, 1322, 1323, and 1324 and the recognition result.

The external electronic device may perform texture segmentation and recognition on the basic image 1310. The external electronic device may acquire a texture segmentation map 1330 illustrated in FIG. 13. For example, the external electronic device may perform texture recognition on the objects 1321, 1322, 1323, and 1324, on which the object recognition has been performed, or may re-divide at least one of the objects 1321, 1322, 1323, and 1324 into parts and may acquire a texture recognition result of each part. Texture may refer to a component representing a predefined particular pattern or texture. One object may include multiple textures. A texture recognition algorithm may also be acquired by applying machine learning or deep learning to a large amount of database. The external electronic device may acquire the texture segmentation map 1330 including position information (or pixel coordination information) of multiple texture objects 1331 to 1336 and a texture recognition result.

The external electronic device may determine a reliability level of a recognition result of the basic image 1310. The external electronic device may determine at least one of a reliability level of an object recognition result or a reliability level of a texture recognition result.

The external electronic device may determine classification information of the basic image 1310. For example, the external electronic device may acquire classification information 1340 illustrated in FIG. 13. The classification information 1340 may be information representing what contents are included as a whole in the basic image 1310. The external electronic device may acquire the classification information 1340 by applying an image classification algorithm to the basic image 1310. The external electronic device may acquire the classification information 1340 by using at least one of an object recognition result or a texture recognition result. Alternatively, the external electronic device may acquire the classification information 1340 directly from the basic image 1310. The classification information 1340 may include, for example, information on an entire image recognition result (scene classification result) which represents normal green grass. The classification information 1340 may also include object information (e.g., sky, balloons, and grass), date information (p.m. 2:00, on August xx, 2016), location information (e.g., Seoul, Korea), season information (e.g., summer), weather information (e.g., sunny), exposure-related information (e.g., exposure time xx, and ISO xxx), and the like. The external electronic device may also acquire the classification information 1340 by using metadata and a result of application of a recognition algorithm.

Figure 14:
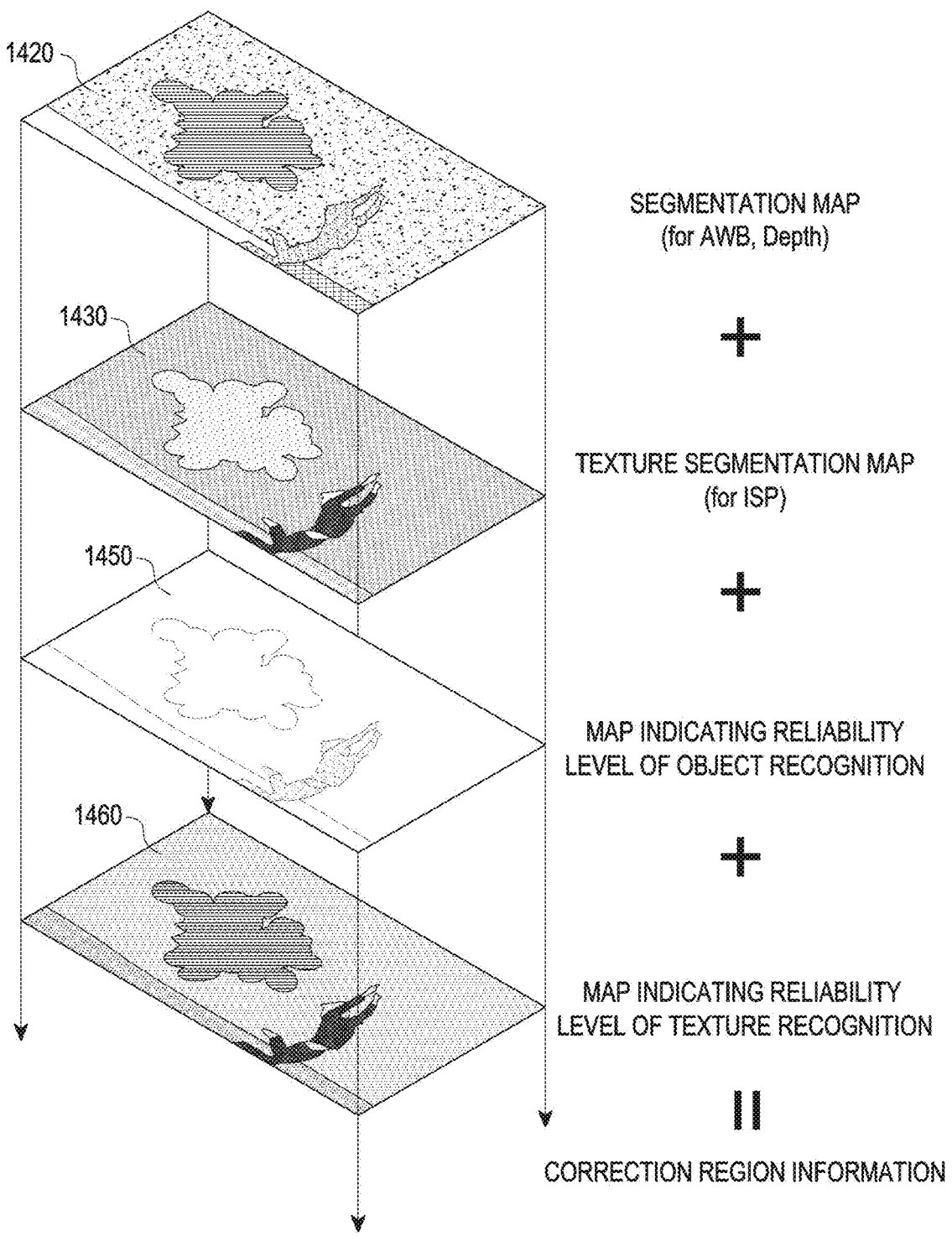
FIG. 14 is a diagram illustrating an example of analysis of image data by an external electronic device according to various embodiments of the disclosure.

The external electronic device may generate correction region information including at least one of object recognition, texture recognition, a reliability level of a recognition result, or classification information. For example, as illustrated in FIG. 14, the external electronic device may generate correction region information configured as multiple layers. The correction region information configured as multiple layers may include a segmentation map 1420, a texture segmentation map 1430, a map 1450 indicating a reliability level of object recognition, and a map 1460 indicating a reliability level of texture recognition. Coordinates of pixels of the multiple maps 1420, 1430, 1450, and 1460 may be identical to one another, and may correspond to pixels of the raw image. Accordingly, multiple pieces of information (e.g., an object attribute, a texture attribute, an accuracy level of an object attribute, and an accuracy level of a texture attribute) to one pixel of the raw image. The external electronic device may transmit, to the electronic device 101, the correction region information configured as multiple layers. The electronic device 101 may perform correction by applying correction region information to the raw image.

For example, the electronic device 101 (e.g., the processor 120) may apply an effect, which corresponds to balloons, to pixels of the raw image corresponding to pixel coordinates of the object "balloons" of the segmentation map 1420. The electronic device may apply an effect, which corresponds to enamel, to pixels of the raw image corresponding to pixel coordinates of the texture object "enamel" of the texture segmentation map 1430. The electronic device may adjust a level of the applied effect in consideration of a reliability level of object recognition or a reliability level of texture recognition. The electronic device may also apply an effect, which corresponds to an outdoor environment, to the entire raw image based on an image classification result (e.g., normal green grass). The formation of configuration of multiple layers illustrated in FIG. 14 is only an example; and correction region information may also be implemented as one-dimensional text information, and thus a data format representing the correction region information is not limited. Among the multiple layers of FIG. 14, some layers may be omitted, or another map may be added thereto.

In various embodiments, the external electronic device may acquire pixel adjustment information of the basic image based on the correction region information generated as described with reference to FIG. 13 and FIG. 14. The external electronic device may transmit the pixel adjustment information to the electronic device 101 through, for example, a communication interface or a communication module of the external electronic device, and the electronic device 101 may generate a corrected image by simply adjusting at least one of the luminance, brightness, color, or color temperature of at least one pixel in a first image according to the pixel adjustment information.

Figure 15:
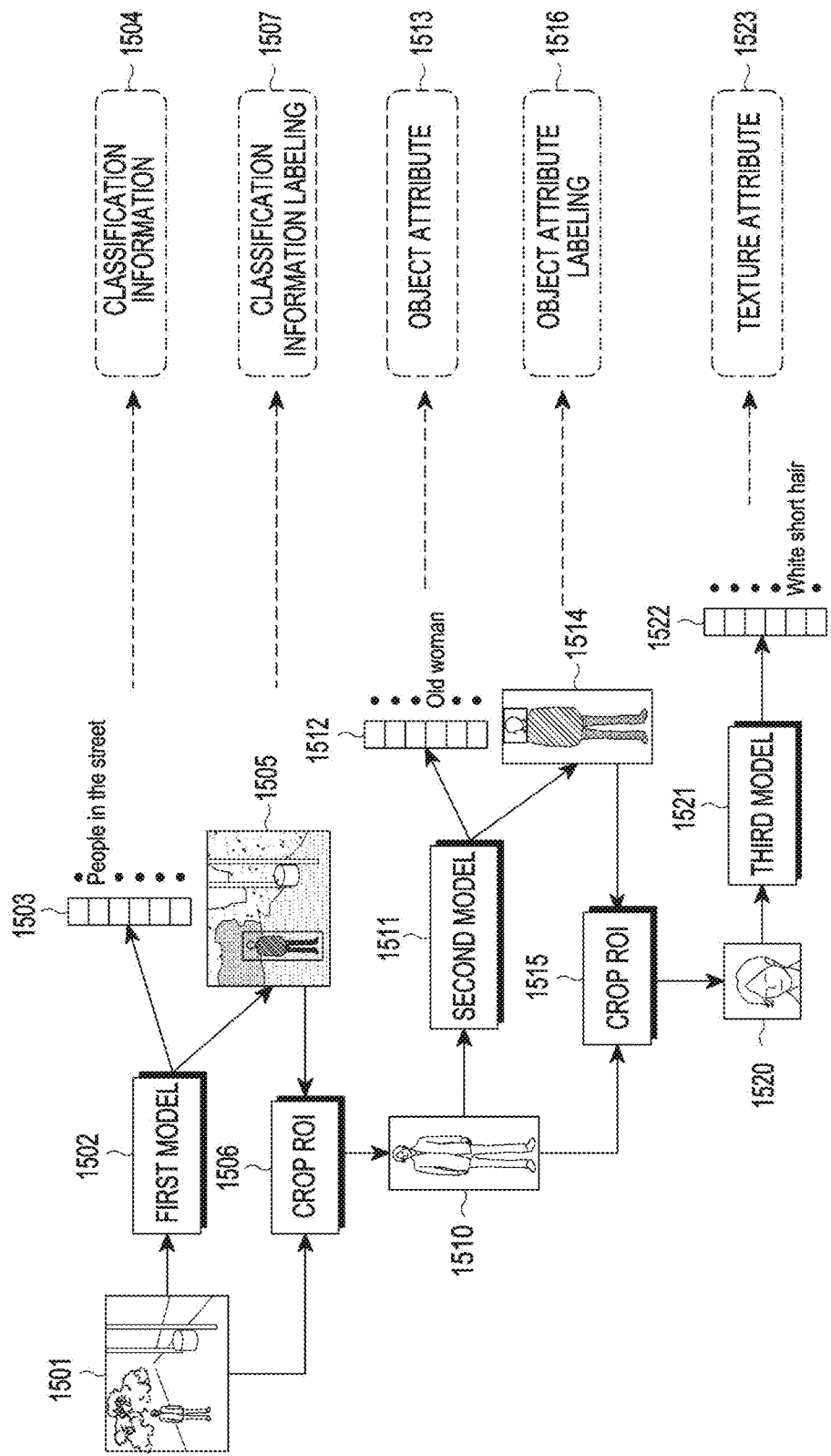
FIG. 15 is a diagram illustrating an example of analysis of image data by an external electronic device according to various embodiments of the disclosure.

FIG. 15 illustrates a conceptual view for explaining generation of correction region information according to various embodiments of the disclosure. The external electronic device 520 (e.g., the server 108 of FIG. 1 or the server 108 of FIG. 3) according to various embodiments may receive a basic image 1501 from the electronic device 101 through, for example, a communication interface or a communication module of the external electronic device 520. The external electronic device may pre-store multiple cognitive models 1502, 1511, and 1521, and accordingly, the multiple cognitive models may mutually supplement problems and various pieces of information may be acquired simultaneously. The external electronic device may apply the first cognitive model 1502 to the basic image 1501. The first cognitive model 1502 may determine at least one of classification information or a Region of Interest (ROI) of an image. Classification information 1504 named "people in the street" may be selected from multiple pieces of classification information 1503 by a result of application of the first cognitive model 1502 to the basic image 1501. That is, classification information of the entire basic image 1501 may be determined to be "people in the street". The external electronic device may label the basic image 1501 with the classification information 1504. For example, the first cognitive model 1502 may select the classification information 1504 by using an overall color distribution of the basic image 1501, a relationship between relative positions at which color regions are arranged in the basic image 1501, and the like. In this example, the classification information 1504 may be acquired even without recognizing particular objects in the basic image 1501. For example, the first cognitive model 1502 may: detect that a color similar to a representative color of the street is distributed over an entire screen and a color, which is similar to a representative color of people and extends upward and downward at a part of a region in which the representative color of the street is distributed, is distributed; and accordingly, determine that the relevant image has the classification information 1504 named "people in the street". The above-described configuration is only an example, and the first cognitive model 1502 according to various embodiments may include various classification information acquisition algorithms. In another embodiment, an external electronic device (e.g., the processor 270 of FIG. 3) may acquire classification information of the basic image 1501 by using at least one of an object recognition result or a texture recognition result. That is, an order, in which the first cognitive model 1502 is applied, is not limited. The first cognitive model 1502 may detect a ROI 1510 from the basic image 1501 by using ROI detection methods of various schemes.

In various embodiments, an external electronic device (e.g., the processor 270 of FIG. 3) may crop (as indicated by reference numeral 1506) the ROI 1510 from a segmentation result 1505, and may apply the second cognitive model 1511 to the cropped ROI 1510. The second cognitive model 1511 may determine at least one of object recognition or a ROI, and may recognize an object in the ROI 1510. Accordingly, the second cognitive model 1511 may identify that an object attribute 1513 is "old woman" among multiple object attributes 1512. The second cognitive model 1511 may include an algorithm for recognizing each of the multiple object attributes 1512. The external electronic device may label the ROI 1510 with the object attribute 1513. For example, the external electronic device may label the ROI 1510 with the object attribute 1513 named "old woman".

In various embodiments, the second cognitive model 1511 may determine a texture segmentation result 1514 from the ROI 1510, and may determine another ROI 1520 from the texture segmentation result 1514. The external electronic device may crop (as indicated by reference numeral 1515) another ROI 1520. The external electronic device may apply the third cognitive model 1521 to another ROI 1520. The third cognitive model 1521 may perform texture recognition. The third cognitive model 1521 may determine that a texture analysis result 1523 of another ROI 1520 is "white short hair" among multiple texture attributes 1522. The third cognitive model 1521 may include a texture recognition algorithm for each of the multiple texture attributes 1522. In various embodiments, even when recognition by the second cognitive model 1511 fails, the third cognitive model 1521 may perform texture segmentation and texture recognition on at least a part of the ROI 1510. In various embodiments, the third cognitive model 1521 may receive, as input, the ROI 1510 other than another ROI 1520 directly from the first cognitive model 1502. The third cognitive model 1521 may perform texture segmentation and texture recognition on the entire basic image 1501. The multiple models 1502, 1511, and 1521 may perform recognition independently rather than in a dependent relationship. For example, even when the classification information 1504 is not acquired from the first cognitive model 1502, the second cognitive model 1511 may perform object recognition on the basic image 1501.

The external electronic device may transmit correction region information including at least one of the classification information 1504, the object attribute 1513, or the texture attribute 1523 to the electronic device 101 through, for example, a communication interface or a communication module of the external electronic device. For example, the external electronic device may include, in correction region information, at least one piece of accuracy level information among the classification information 1504, the object attribute 1513, and the texture attribute 1523, and may transmit the correction region information including the accuracy level information to the electronic device 101 through, for example, the communication interface or the communication module of the external electronic device. The electronic device 101 may apply, to a raw image, an effect corresponding to the correction region information, and accordingly, may generate an image having improved image quality. For example, the electronic device 101 may apply an effect (e.g., a luminance increase) corresponding to "old woman" to a part of the raw image corresponding to a ROI 1510. For example, the electronic device 101 may apply an effect (e.g., sharpening processing and white processing), which corresponds to "white short hair", to a part of the raw image corresponding to another ROI 1520. For example, the electronic device 101 may apply an effect, which corresponds to an outdoor environment, to the entire raw image based on the classification information 1504 named "people in the street".

In various embodiments of the disclosure, the external electronic device may update at least one of the first cognitive model 1502, the second cognitive model 1511, or the third cognitive model 1521, and may add another cognitive model to the first, second, and third cognitive models 1502, 1511, and 1521. The external electronic device may generate correction region information by using the updated multiple cognitive models, and may transmit the same to the electronic device 101. Even without replacing or upgrading an ISP of the electronic device 101, the electronic device 101 may generate an image having improved image quality based on the updated cognitive model.

In various embodiments of the disclosure, an external electronic device may acquire pixel adjustment information of a basic image based on the correction region information generated as described with reference to FIG. 15. The external electronic device (e.g., the processor 270 of FIG. 3) may transmit the pixel adjustment information to the electronic device 101 through, for example, a communication interface or a communication module of the external electronic device, and the electronic device 101 may generate a corrected image by simply adjusting at least one of the luminance, brightness, color, or color temperature of at least one pixel in a raw image according to the pixel adjustment information.

Figure 16:
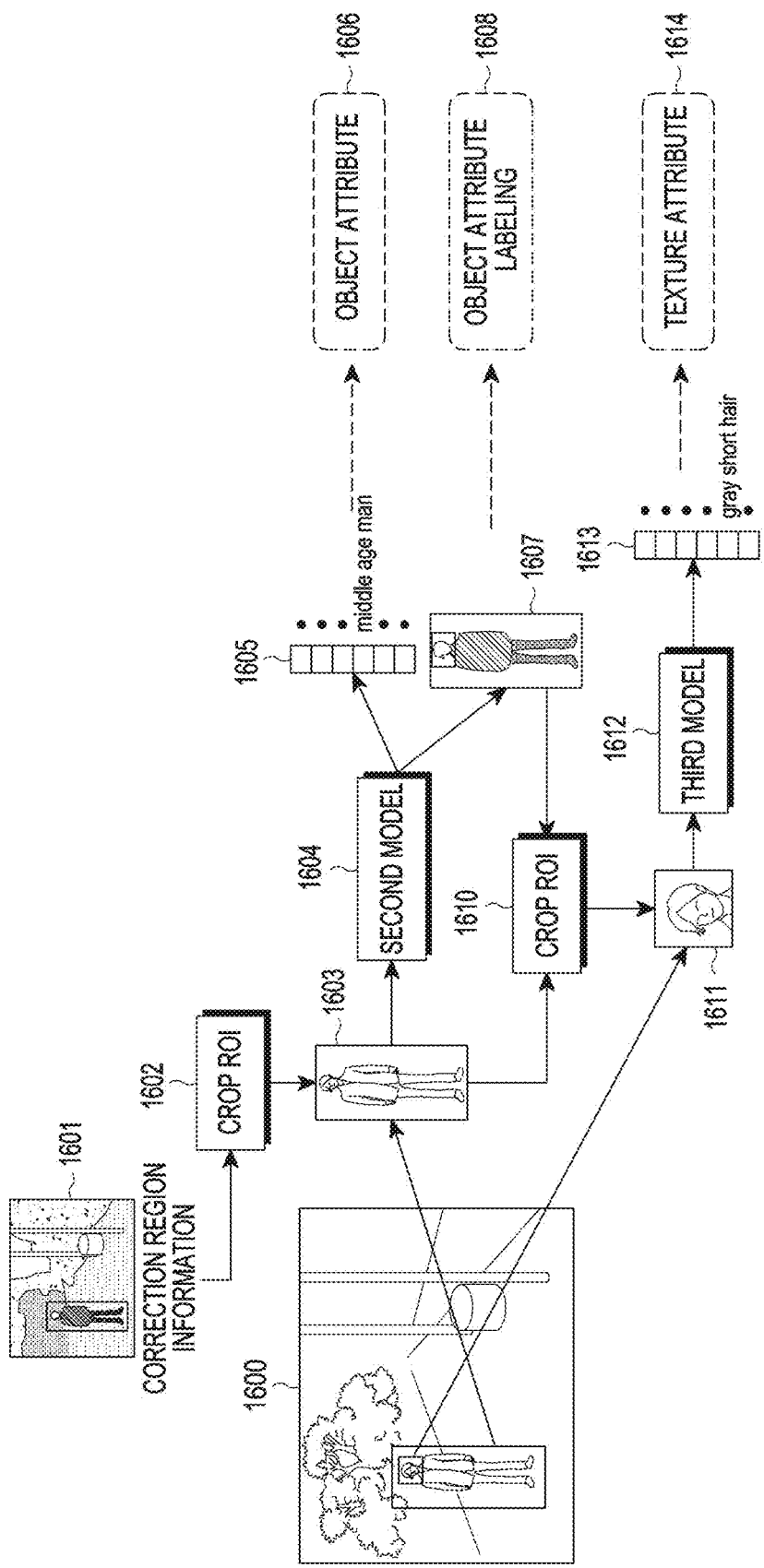
FIG. 16 is a diagram illustrating an example of analysis of image data by an external electronic device according to various embodiments of the disclosure.

FIG. 16 is a diagram illustrating an example of analysis of image data by an external electronic device according to various embodiments of the disclosure. The external electronic device (e.g., the external electronic device 520, i.e., the processor 270 of FIG. 3) according to various embodiments may acquire extended correction region information by using correction region information 1601 acquired based on a basic image. For example, the external electronic device may crop (as indicated by reference numeral 1602) a ROI, which is to be recognized, based on a recognition result obtained by performing typical recognition. The external electronic device may crop a ROI 1603 from a raw image 1600. The external electronic device may crop the ROI 1603 from the raw image 1600 corresponding to a ROI identified in the basic image.

The external electronic device may apply a second cognitive model 1604 to the ROI 1603. The external electronic device may determine that an object attribute 1606 of the ROI 1603 corresponds to "middle aged man" among multiple object attributes 1605, as a result of application of the second cognitive model 1604. For example, as in the embodiment of FIG. 15, the external electronic device may acquire the object attribute 1513 representing "old woman" in relation to the ROI 1510 of the basic image 1501. The external electronic device may acquire a more accurate object attribute 1606 by applying the second cognitive model 1604 to the ROI 1603 of the raw image 1600 having image quality higher than that of the basic image 1501.

The external electronic device may crop (as indicated by reference numeral 1610) another ROI 1611 based on a texture segmentation result 1607. The external electronic device may apply a third cognitive model 1612 to another ROI 1611. The external electronic device may identify that a texture attribute 1614 of another ROI 1611 is "gray short hair" among multiple texture attributes 1613. The external electronic device may acquire a more accurate object attribute 1614 by applying the third cognitive model 1612 to another ROI 1611 of the raw image 1600 having image quality higher than that of the basic image 1501.

Figure 17:
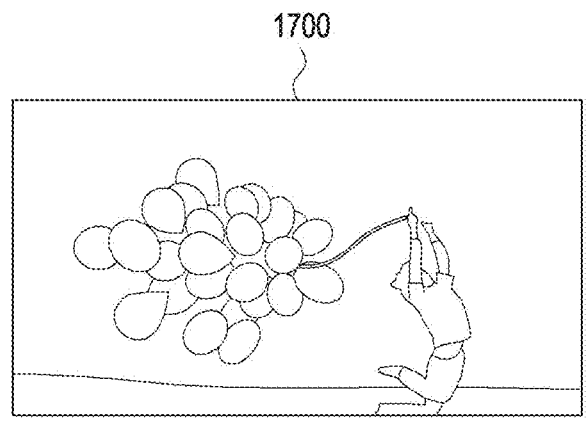
FIG. 17 is a view illustrating an original image for analysis of an image according to various embodiments of the disclosure.
Figure 18:
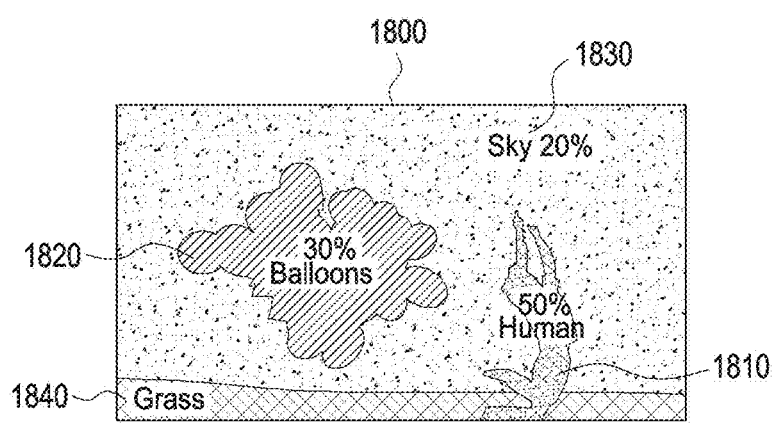
FIG. 18 is a view illustrating an image analysis result of a basic image according to various embodiments of the disclosure.

FIG. 17 is a view illustrating an original image for analysis of an image according to various embodiments of the disclosure. FIG. 18 is a view illustrating an image analysis result of a basic image according to various embodiments.

An image analysis module (e.g., the image analysis module 522 of FIG. 5) may perform image analysis of an entire image region 1700 of an original image of FIG. 17, and thus analysis may be performed below for each of regions of an entire image region 1800 as illustrated in FIG. 18.

1. Grass region 1840: A person's concentration level on this region is low and this region includes a lot of texture, and thus has a small effect on an improvement in subjective image quality through an additional extended layer. Therefore, data transmitted through a basic layer is enough to be used for this region.

2. Sky region 1830: A person's concentration level on this region is low, but this region is a smooth region, and thus this region may be allocated a smaller amount of data (e.g., 20%) than another region through an extended layer.

3. Balloon region 1820: This region has various colors and corresponds to an object located in the center, and thus a person's concentration level on this region is high. For an improvement in subjective image quality, this region may be allocated a relatively large percentage (e.g., 30%) of data of an extended layer.

4. Human region 1810: This region corresponds to an object, on which a person's concentration level is high and which is located in the center, and thus may be allocated a relatively largest percentage (e.g., 50%) of data of an extended layer.

Figure 19:
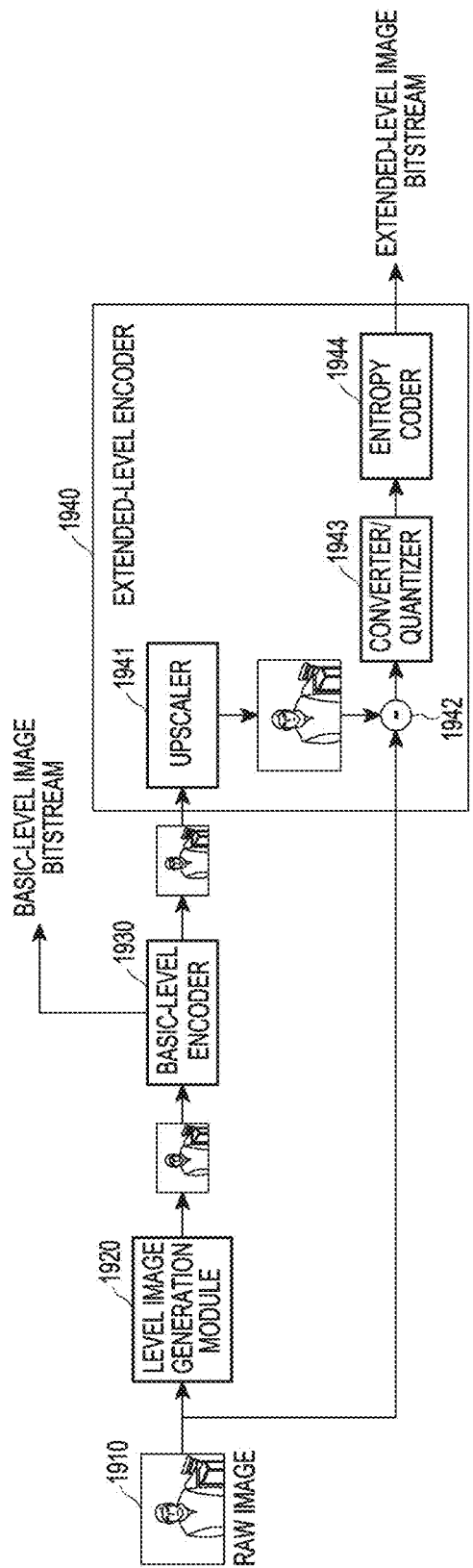
FIG. 19 is a block diagram illustrating a specific configuration of an extended-level encoder according to various embodiments of the disclosure.

FIG. 19 is a block diagram illustrating a specific configuration of an extended-level encoder according to various embodiments of the disclosure. Referring to FIG. 19, as described above, a level image generation module 1920 of an electronic device (e.g., the electronic device 101 of FIG. 1) may generate a basic image from a raw image 1910.

A basic-level encoder 1930 may encode the basic image according to a designated scheme, and may transmit the encoded basic image to an external electronic device (e.g., the server 108 of FIG. 1).

According to various embodiments, an extended-level encoder 1940 may include an upscaler 1941, a mixer 1942, a converter/quantizer 1943, an entropy coder 1944, and the like. The upscaler 1941 may upscale the basic image encoded by the basic-level encoder 1930. The mixer 1942 may mix the upscaled basic image and the raw image. The data mixed by the mixer 1942 may be converted and quantized by the converter/quantizer 1943.

The entropy coder 1944 may entropy-code the converted and quantized data, and thus may output an extended-level image.

Figure 20:
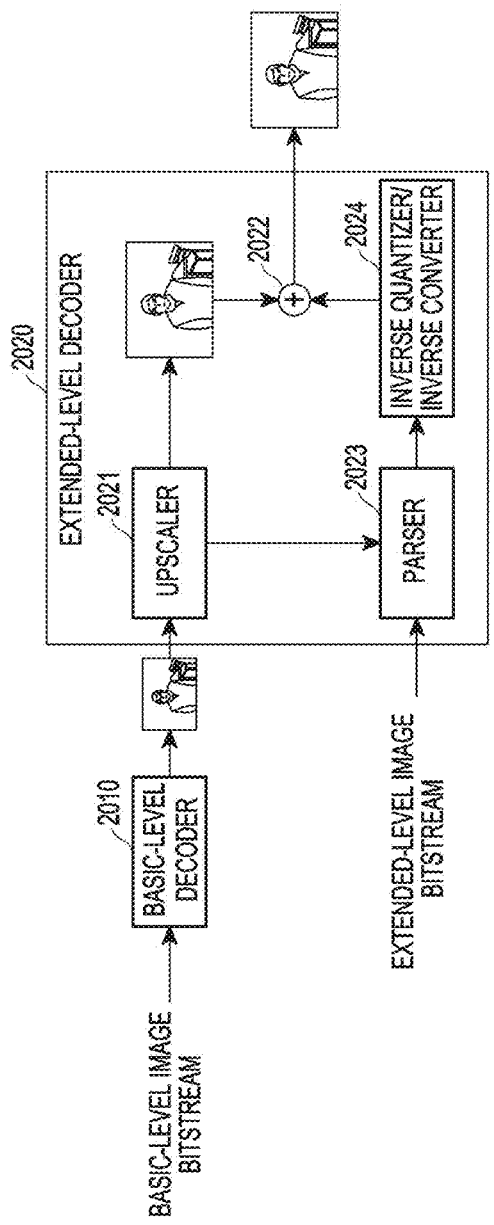
FIG. 20 is a block diagram illustrating a specific configuration of an extended-level decoder according to various embodiments of the disclosure.

FIG. 20 is a block diagram illustrating a specific configuration of an extended-level decoder according to various embodiments of the disclosure. Referring to FIG. 20, a basic-level image received by an external electronic device (e.g., the server 108 of FIG. 1) is decided by a basic-level decoder 2010. The decoded basic image may be decoded by an extended-level decoder 2020. The extended-level decoder 2020 may perform encoding according to an encoding scheme of the extended-level encoder 1940 of FIG. 19.

According to various embodiments, an upscaler 2021 may upscale a decoded basic image, and a parser 2023 may parse the upscaled basic image and an extended image. The parsed data may be inversely quantized and inversely converted by an inverse quantizer/inverse converter 2024. A mixer 2022 may generate a mixed image by mixing the upscaled basic image and output data from the inverse quantizer/inverse converter 2024.

Figure 21:
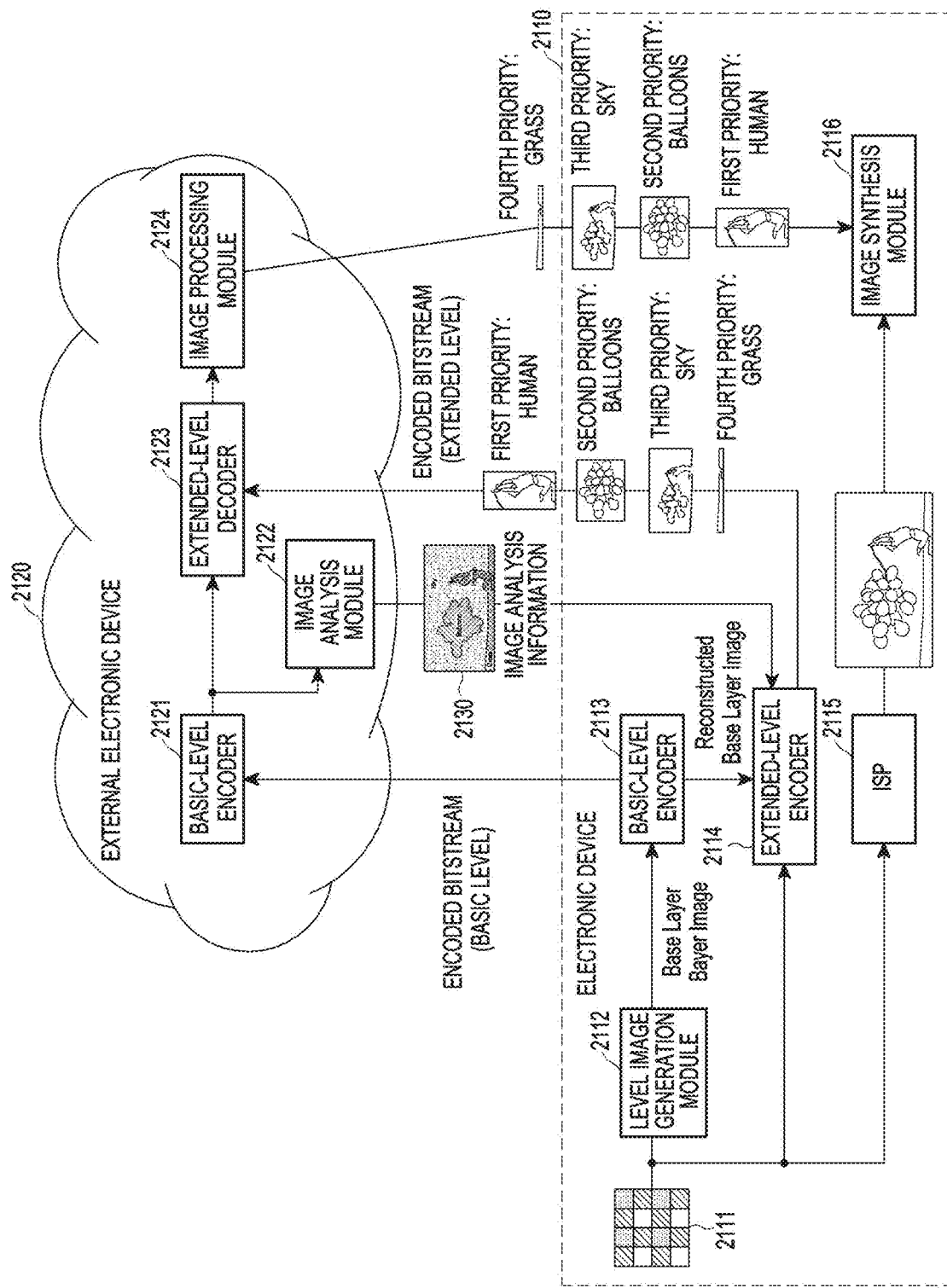
FIG. 21 is a diagram illustrating an example of a network configuration illustrating an example in which each of an electronic device and an external electronic device processes image data according to various embodiments of the disclosure.

FIG. 21 is a diagram illustrating an example of a network configuration illustrating an example in which each of an electronic device and an external electronic device processes image data according to various embodiments of the disclosure. In FIG. 21, specific functions of: a level image generation module 2112, a basic-level encoder 2113, an extended-level encoder 2114, included in the electronic device 2110; and a basic-level decoder 2121, an image analysis module 2122, an extended-level decoder 2123, and an image processing module 2124, included in the external electronic device 2120 (e.g., a cloud server), include the functions described above with reference to FIG. 5, FIG. 11, and FIG. 12, and thus a detailed description thereof will be omitted.

Referring to FIG. 21, the external electronic device 2120 (e.g., a cloud server) may perform image analysis and recognition based on a basic layer, may receive a recognition information map as described above and priority information as a recognition result from the electronic device 2110, and may perform image analysis and recognition according to respective regions in descending order of priority during encoding of an extended image. The extended image encoded according to encoding priorities of the extended image may be sequentially transmitted to the external electronic device 2120.

For example, as illustrated in FIG. 21, transmissions of data in descending order of priority, such as "human→balloons→sky→grass", to the external device 2120 may be performed.

The external electronic device 2120 may perform image processing (e.g., second image processing) through an image processing module 2124 capable of advanced image processing compared to an ISP 2115 of the electronic device 2110, and then may transmit data to the electronic device 2110 in order of priority.

The ISP 2115 of the electronic device may first-image-process a raw image or an extended image. The image synthesis module 2116 may synthesize region-specific improved image parts transmitted by the image processing module 2124, based on an image first-image-processed by the ISP 2115, and may display a synthesized image on a screen. For example, the electronic device may perform real-time image synthesis of data, second-image-processed by the image processing module 2124, in the order of the received regions, and may display a synthesized image on the screen. According to various embodiments, the image synthesis module 2116 may correct the first-image-processed data (e.g., data obtained by first-image-processing a raw image or an extended image) based on the second-image-processed data transmitted by the external electronic device 2120. For example, the image synthesis module 2116 allows the transmitted second-image-processed data to replace a region corresponding to the second-image-processed data in an entire region of the first-image-processed data.

According to various embodiments, a synthesized image output from the image synthesis module 2116 may be improved in the order of "human→balloons→sky→grass" and displayed on the screen, and thus a user can view an improved image on the screen.

Figure 22:
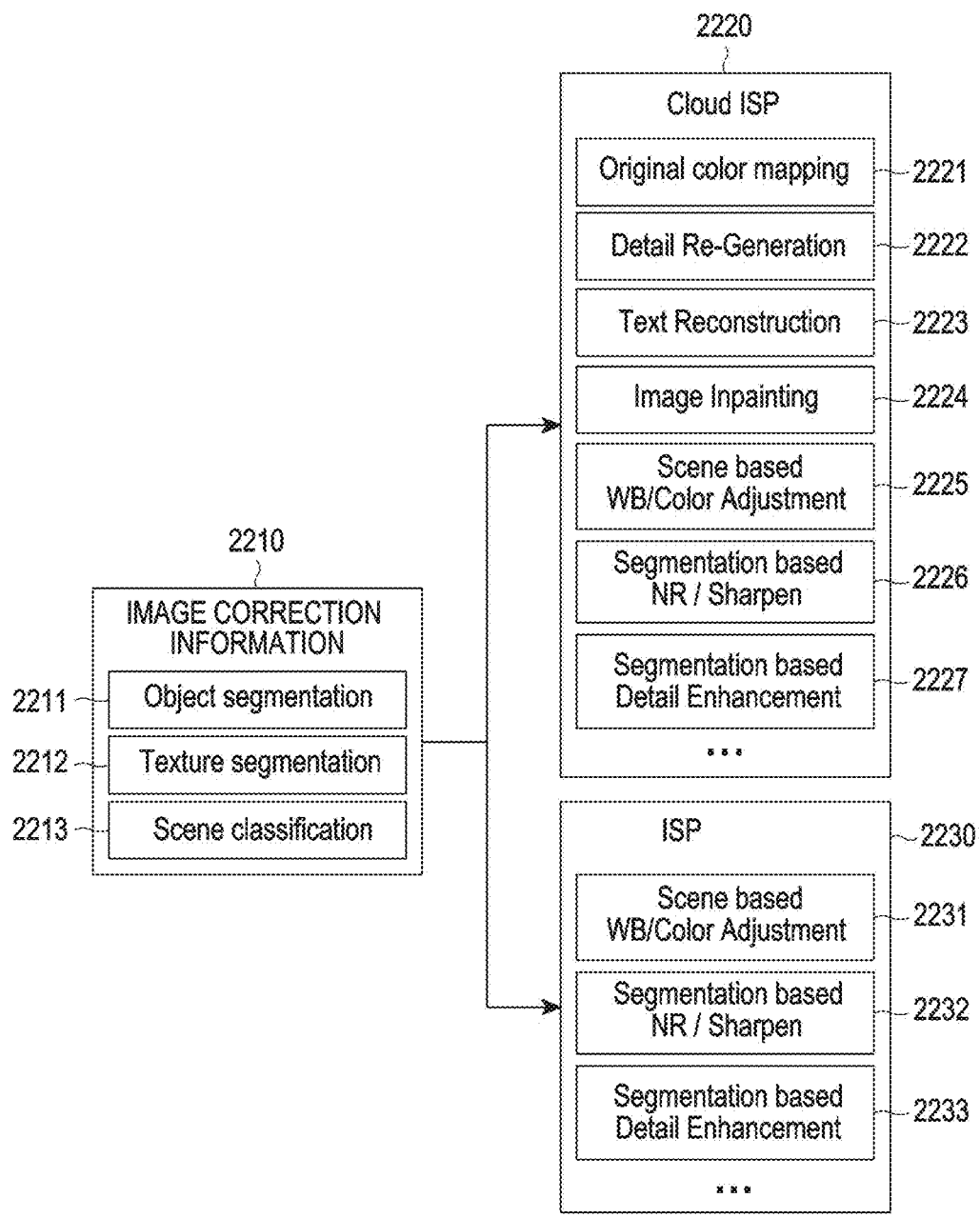
FIG. 22 is a block diagram illustrating a configuration of an ISP of an electronic device and a configuration of an ISP of an external electronic device according to various embodiments of the disclosure.

FIG. 22 is a block diagram illustrating a configuration of an ISP (e.g., the ISP 2115 of FIG. 21) of an electronic device and a configuration of an ISP (e.g., the image processing module 2124 of FIG. 21) of an external electronic device according to various embodiments of the disclosure. Image correction information 2210 according to various embodiments may include at least one piece of information among object segmentation information 2211, texture segmentation information 2212, and scene classification information 2213. The image correction information 2210 may be used by the ISP 2220 of the external electronic device or the ISP 2230 of the electronic device. The external electronic device may be implemented by, for example, a cloud server, and accordingly, the ISP 2220 of the external electronic device may be referred to as a "cloud ISP". The ISP 2220 of the external electronic device may perform at least one correction among original color mapping 2221, detail regeneration 2222, text reconstruction 2223, image inpainting 2224, scene-based White Balance (WB)/color adjustment 2225, segmentation-based Noise Reduction (NR)/sharpen 2226, and segmentation-based detail enhancement 2227. The ISP 2230 of the electronic device may perform at least one correction among scene-based WB/color adjustment 2231, segmentation-based NR/sharpen 2232, and segmentation-based detail enhancement 2233.

For example, the ISP 2230 of the electronic device may strongly apply sharpen and detail enhancement to a region corresponding to a person's hair, and may strongly apply NR to a region corresponding to a person's face. The ISP 2220 of the external electronic device may have a larger amount of resources and higher calculation capability than the ISP 2230 of the electronic device, and accordingly, may additionally perform corrections, including original color mapping 2221, detail regeneration 2222, text reconstruction 2223, image inpainting 2224, and the like. The ISP 2220 of the external electronic device may generate, for example, a feature vector corresponding to the scene classification information 2213, and may map an original color of an object to be captured or may regenerate details of the object to be captured. The ISP 2220 of the external electronic device may perform text reconstruction through text recognition, and may perform image inpainting for filling an erased part on the recognized object. Accordingly, a raw image corrected by the external electronic device may have higher image quality than a raw image corrected by the electronic device.

Figure 23:
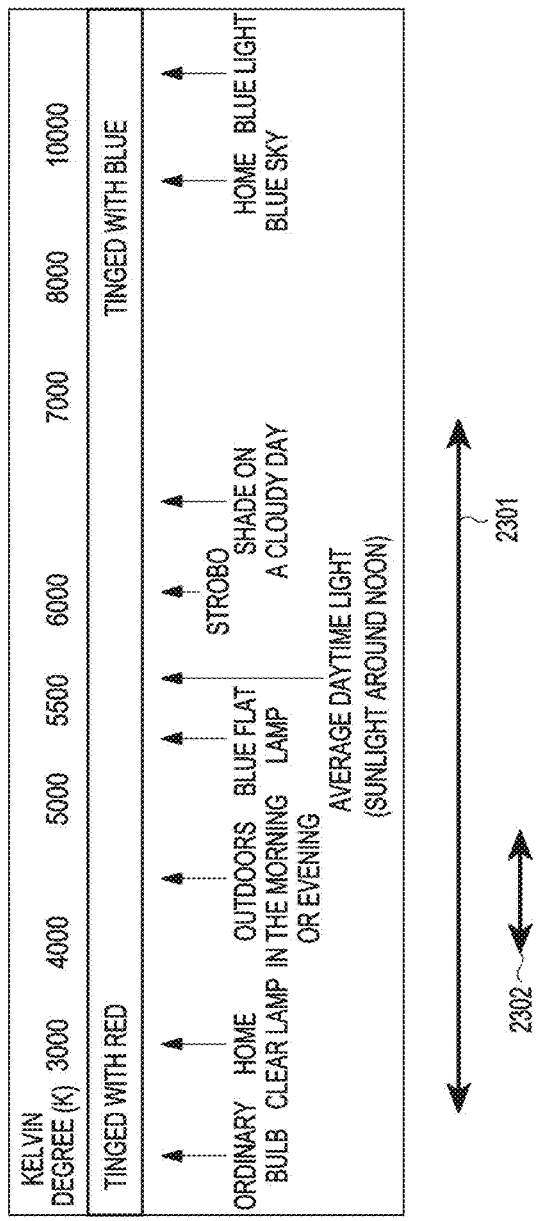
FIG. 23 illustrates a conceptual view for explaining an improvement in an accuracy level of Auto White Balance (AWB) by using image classification according to various embodiments of the disclosure.

FIG. 23 illustrates a conceptual view for explaining an improvement in an accuracy level of AWB by using image classification according to various embodiments of the disclosure. AWB may refer to a process for, in order to maintain color constancy in various light sources, guessing a point including white or gray colors and adjusting white balance so that the relevant point can be represented in white. Examples of an environment in which an electronic device captures an image may include a lighting environment having low color temperature such as an incandescent lamp, a fluorescent lamp used in an indoor space, a lighting environment such as an LED, and an outdoor environment having high color temperature such as shade under blue sky on a sunny day. Capturing environments may be roughly classified into outdoors, indoors, and night according to illuminance (luminance) at the time of capturing, but the possibility of an error of AWB may become higher in environments which have similar luminances but in which different types of lighting are used. This is because, when two different objects have been captured in different types of lighting, ratios of RGB output from a sensor take similar values. An object corresponding to a bright tree under indoor lighting may be confused with a white object under incandescent light. As a similar example, a shaded forest or shaded grass widely distributed on a screen may be confused with a white object captured under fluorescent light. In image classification, if circumstances in which an image is currently being captured is recognized, a range of color temperature which should be determined by AWB may be reduced, and an error of AWB may also be reduced. In the related art, a candidate of white needs to be selected in a wide range 2301 between 2,800° K to 7,000° K in a particular illuminance, and thus there is the possibility of an error of AWB. In various embodiments, if a captured image is classified as an image captured in an indoor office environment, a candidate region of white may be selected in a narrower range 2302 than in the related art in consideration of a general lighting environment of an office (lighting of 3,500° K to 5,500° K), and an accuracy level of AWB can be improved.

Figure 24:
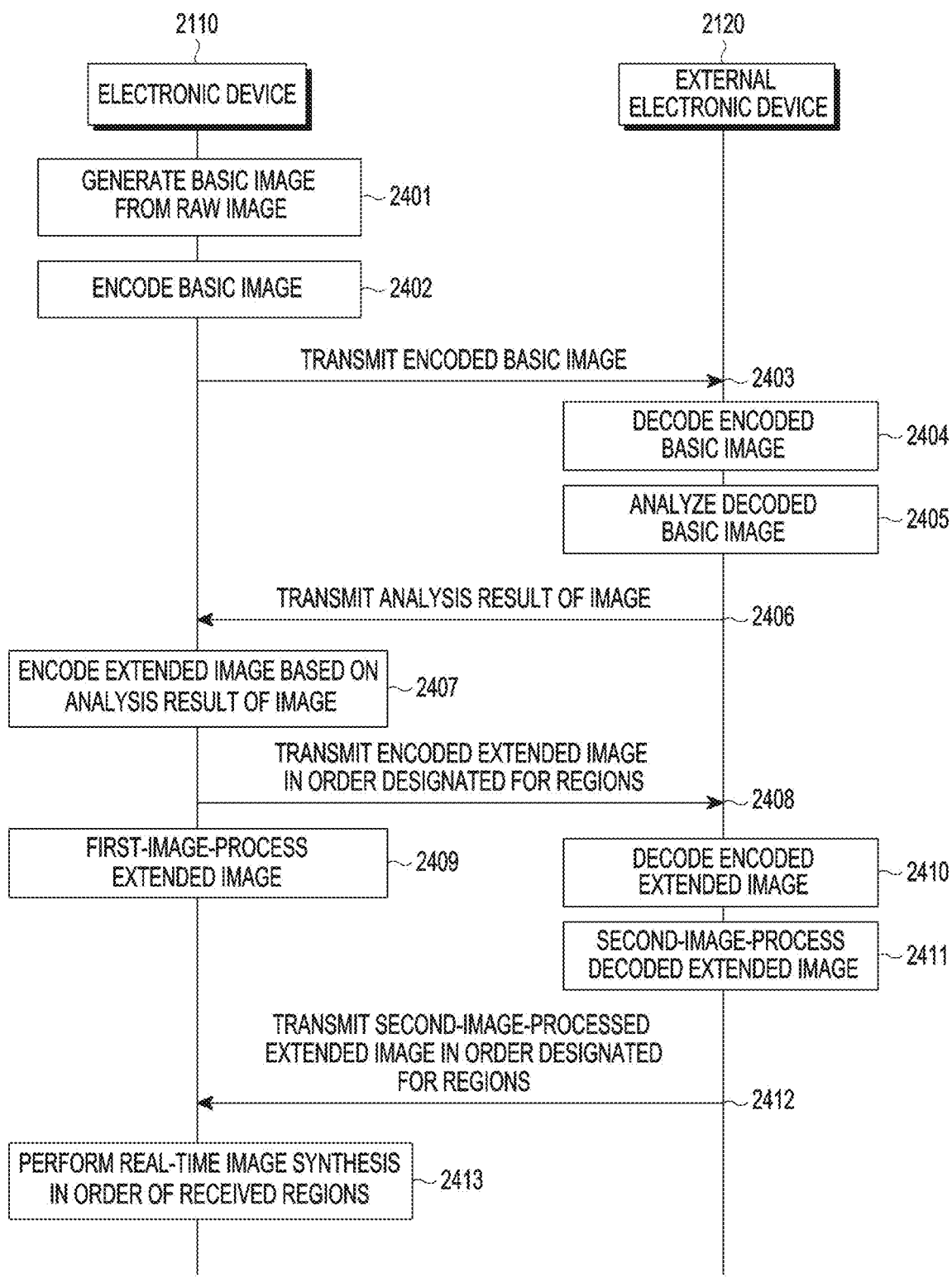
FIG. 24 is a signal flow diagram illustrating a procedure for processing image data by an electronic device and an external electronic device according to various embodiments of the disclosure.

FIG. 24 is a signal flow diagram illustrating a procedure for processing image data by an electronic device and an external electronic device according to various embodiments of the disclosure.

Referring to FIG. 24, in operation 2401, an electronic device 2110 (e.g., the electronic device 101 of FIG. 1, i.e., the processor 120 or the processor 264) may generate a basic image from a raw image.

In operation 2402, the electronic device may encode the basic image, and in operation 2403, may transmit the encoded basic image to an external electronic device 2120 (e.g., the server 108 of FIG. 1).

In operation 2404, the external electronic device may decode the encoded basic image, and in operation 2405, may analyze the decoded basic image.

In operation 2406, the external electronic device may transmit an analysis result of the image to the electronic device.

In operation 2407, the electronic device 2110 may encode an extended image based on the analysis result of the image received from the external electronic device. In operation 2408, the electronic device may transmit the encoded extended image to the external electronic device 2120. In operation 2409, the electronic device may first-image-process the raw image or the extended image by using the ISP 2115.

In operation 2410, the external electronic device may decode an encoded extended image received from the electronic device, and in operation 2411, may second-image-process the decoded extended image through the image processing module 2124. In operation 2412, the external electronic device may transmit the second-image-processed extended image to the electronic device in the order of corresponding regions according to designated priorities.

In operation 2413, the electronic device may perform real-time image synthesis in the order of the received regions, and may display a synthesized image on a screen. According to various embodiments, the electronic device may correct the first-image-processed data (e.g., data obtained by first-image-processing the raw image or the extended image) based on the second-image-processed data transmitted by the external electronic device. For example, the electronic device allows the transmitted second-image-processed data to replace a region corresponding to the second-image-processed data in an entire region of the first-image-processed data.

Figure 25:
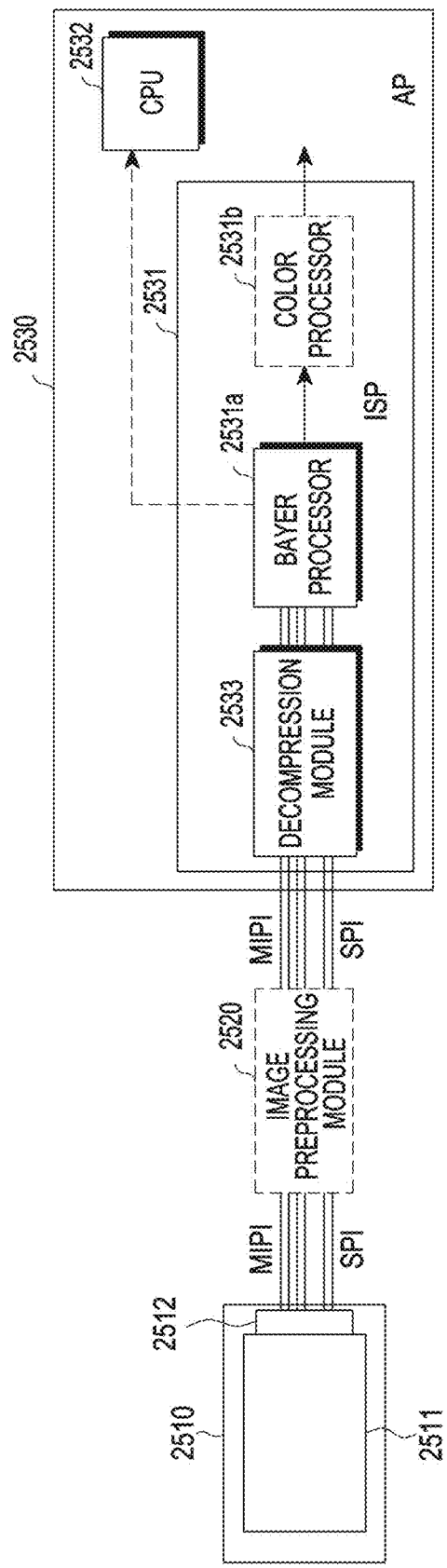
FIG. 25 is a block diagram illustrating a specific configuration of an electronic device according to an embodiment of the disclosure.

FIG. 25 is a block diagram illustrating a specific configuration of an electronic device according to an embodiment of the disclosure. Referring to FIG. 25, the electronic device (e.g., the electronic device 101 of FIG. 1) according to various embodiments may include an image sensor module 2510 (e.g., the image sensor 230 of FIG. 2), an image preprocessing module 2520 (e.g., a companion chip), and an Application Processor (AP) 2530 (e.g., the processor 120 of FIG. 1). The image processing apparatus may be implemented such that the image sensor module 2510 is directly connected to the AP 2530 without interposition of the image preprocessing module 2520.

The image sensor module 2510 may sense an image, and may transmit each pixel value, sensed through a Mobile Industry Processor Interface (MIPI) line, to the image preprocessing module 2520 or the AP 2530. Further, the image sensor module 2510 may transmit or receive various control signals through a Serial Peripheral Interface (SPI). The image sensor module 2510 may include an image sensor 2511 (e.g., a CMOS sensor, i.e., the image sensor 230 of FIG. 2) and a control circuit 2512.

The image preprocessing module 2520 may be additionally configured to support a particular function of an image sensor. For example, the image preprocessing module 2520 may perform preprocessing for improving image quality of an image.

The AP 2530 may include an ISP 2531 and a Central Processing Unit (CPU) 2532. The ISP 2531 may include a Bayer processor 2531a, a color processor 2531b (luma/color), and a decompression module 2533.

Figure 26:
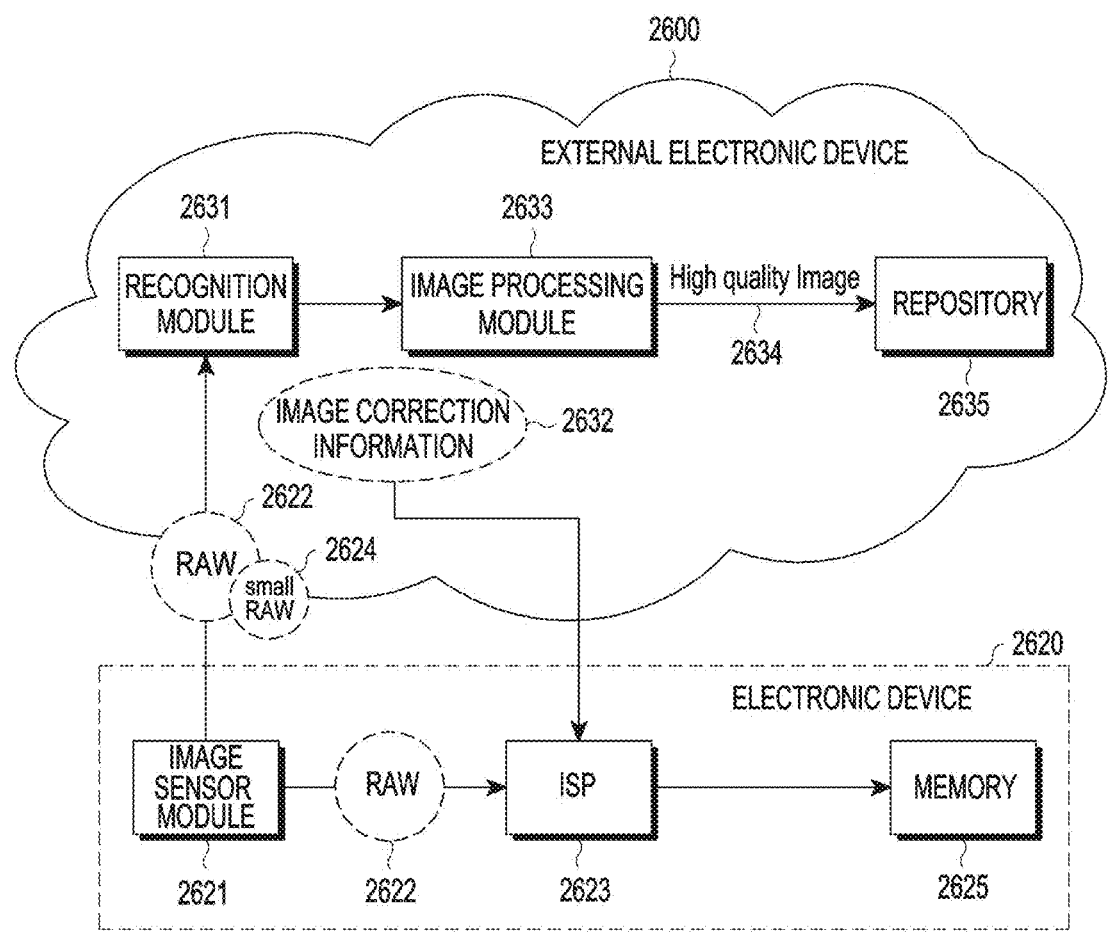
FIG. 26 is a diagram illustrating a specific configuration of each of an electronic device and an external electronic device according to an embodiment of the disclosure.

FIG. 26 illustrates a conceptual view for explaining operations of an electronic device and an external electronic device according to various embodiments of the disclosure.

The electronic device (e.g., the electronic device 101 of FIG. 1) may include an image sensor module 2621 (e.g., the image sensor module 2510), an ISP 2623 (e.g., the processor 120 or the ISP 2531), and a memory 2625. The external electronic device 2600 (e.g., the server 108 of FIG. 1) may include a recognition module 2631, an image processing module 2633, and a repository 2635. The recognition module 2631 may be a logic module, and may be implemented by a processor of the external electronic device 2600. The image processing module 2633 may also be implemented by a processor of the external electronic device 2600, and for example, the processor of the external electronic device 2600 may perform both recognition and image processing. Although not illustrated, the electronic device 2601 may include a communication module (e.g., the interface 177 or the communication module 190) capable of transmitting or receiving data with the external electronic device 2600. The external electronic device 2600 may include a communication module capable of transmitting or receiving data with the electronic device 2601.

The image sensor module 2621 (e.g., the control circuit 2512) may acquire an image of an external object, and may generate a raw image 2622 corresponding to the acquired image of the external object. The image sensor module 2621 may deliver the raw image 2622 to the ISP 2623. In various embodiments, the image sensor module 2621 may generate a basic image 2624 (a small raw image), and may transmit the same to the external electronic device 2600 through the communication module.

According to various embodiments, the basic image 2624 may refer to a raw image having a data size smaller than that of the raw image 2622, and is not limitedly interpreted as an image generated in a particular format or a particular method. For example, the basic image 2624 may be generated by reducing the capacity of the raw image 2622, and the generated image may be referred to as a "lightweight image". For example, the electronic device 2601 may generate the basic image 2624 from the raw image 2622 by using various downscaling schemes or downsampling schemes. The electronic device 2601 may perform at least one of, for example, adjustment of a resolution of the raw image 2622, selection of at least some of multiple frequency bands of the raw image 2622, or selection of at least one of multiple bit-plane levels of the raw image 2622, and thus may generate the basic image 2624 having a data size smaller than that of the raw image 2622. The electronic device 2601 may generate the basic image 2624 by extracting, for example, a low-frequency band from the raw image 2622. The electronic device 2601 may also generate the basic image 2624 by selecting, for example, some bit-plane levels from multiple bit-plane levels of the raw image 2622. The basic image 2624 may include at least a part of information of the raw image 2622, and may have smaller capacity than the raw image 2622. When the basic image 2624 instead of the raw image 2622 is transmitted to the external electronic device 2600, data having smaller capacity is transmitted, and thus an image can be more quickly transmitted to the external electronic device 2600.

In another embodiment, not the image sensor module 2621 but a processor of the electronic device 2601 may generate a basic image 2624, and the generated basic image 2624 may be transmitted to the external electronic device 2600 through the communication module. The image sensor module 2621 may process at least a part of the raw image 2622, or may compress the raw image 2622 in order to transmit the same to the outside (e.g., a processor (e.g., an ISP) or the external electronic device 2600). The image sensor module 2621 may transmit the compressed raw image 2622 to the ISP 2623 or the external electronic device 2600 (e.g., the image processing module 2633). In another embodiment, the ISP 2623 (e.g., the processor 120 or the ISP 2531) may transmit a compressed raw image or the basic image 2624, received from the image sensor module 2621, to the external electronic device 2600. In order to process a part of the raw image 2622, the image sensor module 2621 may compress the raw image 2622, and may temporarily store the compressed raw image 2622 in a memory within the image sensor module 2621. The recognition module 2631 of the external electronic device 2600 may acquire the basic image 2624 through the communication module, and may segment at least one image region from the basic image 2624. The recognition module 2631 may recognize each of the at least one image region divided according to a segmentation result. Information, for example, image correction information 2632 including at least one of coordinate information of an image region or a recognition result thereof, related to the multiple image regions generated by the recognition module 2631 may be generated. The image correction information 2632 may be transmitted to the electronic device 2601. The ISP 2623 may correct the raw image 2622 by using the image correction information 2632, and accordingly, may generate a corrected image. The corrected image may have, for example, a YUV format. The corrected image may be stored in the memory 2625. Alternatively, the corrected image may be compressed according to, for example, a JPEG scheme, and the compressed image may be stored in the memory 2625.

In various embodiments of the disclosure, the raw image 2622 provided by the image sensor module 2621 may be transmitted to the external electronic device 2600, separately from the basic image 2624. Since the raw image 2622 has larger capacity than the basic image 2624, the basic image 2624 may be first transmitted to the external electronic device 2600, and then the raw image 2622 may be transmitted to the external electronic device 2600. For example, while the ISP 2623 corrects the raw image 2622, the raw image 2622 may be transmitted to the external electronic device 2600. The raw image 2622 generated by the image sensor module 2621 may be uploaded, as it is, to the external electronic device 2600, or a preprocessed image obtained by performing lens distortion compensation or noise removal, may be uploaded thereto. The above-described preprocessing may be performed by the external electronic device 2600. The external electronic device 2600 may also perform demosaic processing, image format conversion, or preprocessing for increasing an image recognition rate. The image processing module 2633 of the external electronic device 2600 may correct the received raw image 2622. The external electronic device 2600 may correct the raw image 2622 by using the pre-generated image correction information 2632, or may correct the raw image 2622 by using extended image correction information. The raw image 2622 may have a higher resolution than the basic image 2624, and accordingly, the image processing module 2633 of the external electronic device 2600 may acquire more detailed extended image correction information from the high-resolution image. The image processing module 2633 may generate extended image correction information by using the pre-generated image correction information and the raw image 2622 together. The image processing module 2633 may acquire a high-resolution image (a high-quality image) 2634 by correcting the raw image 2622 by using the extended image correction information. The high-quality image 2634 may be stored in the repository 2635 of the external electronic device 2600, and may also be downloaded to the electronic device 2601.

Figure 27:
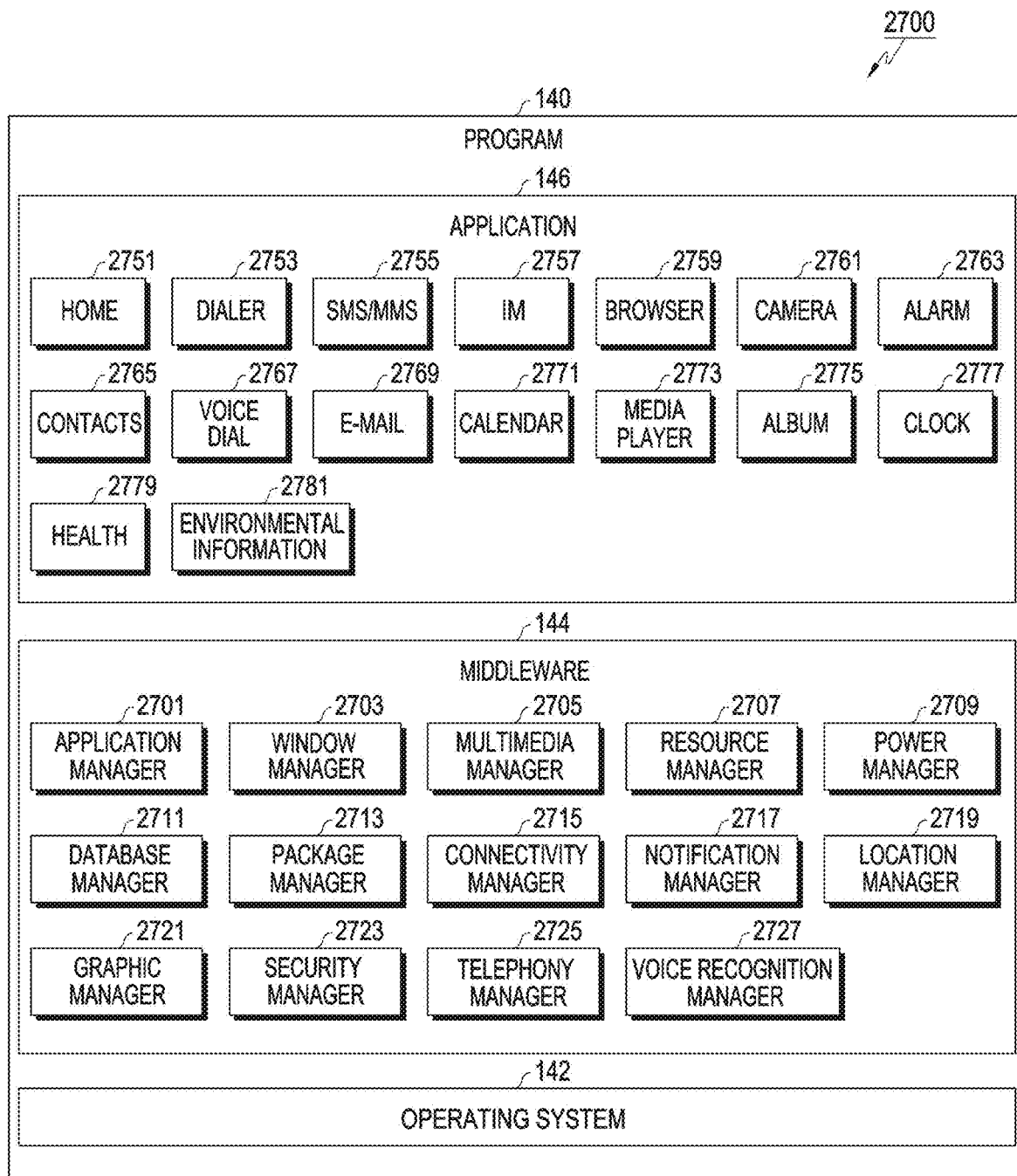
FIG. 27 is a block diagram illustrating a specific configuration of a program module according to an embodiment of the disclosure.

FIG. 27 is a block diagram 2700 illustrating a configuration of a program 140 according to various embodiments. According to an embodiment, the program 140 may include the operating system 142 and the middleware 144 that control one or more resources of the electronic device 101, or the application 146 that can be executed on the operating system 142. The operating system 142 may include, for example, Android™, iOS™, Windows™, Symbian™, Tizen™, or Bada™. For example, at least a part of the program 140 may be preloaded on the electronic device 101 at the time of manufacturing, or may be downloaded or updated from an external electronic device (e.g., the electronic device 102 or 104, or the server 108) in an environment for use of the electronic device 101 by a user.

The operating system 142 may control (e.g., allocate or retrieve) system resources (e.g., a process, a memory, or power) of the electronic device 101. Additionally or alternatively, the operating system 142 may include one or more driver programs for driving another hardware device of the electronic device 101, wherein said another hardware device may be, for example, the input apparatus 150, the sound output apparatus 155, the display apparatus 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 so that the application 146 can use a function or information provided by one or more resources of the electronic device 101. The middleware 144 may include, for example, an application manager 2701, a window manager 2703, a multimedia manager 2705, a resource manager 2707, a power manager 2709, a database manager 2711, a package manager 2713, a connectivity manager 2715, a notification manager 2717, a location manager 2719, a graphic manager 2721, a security manager 2723, a telephony manager 2725, or a voice recognition manager 2727. The application manager 2701 may manage, for example, a life cycle of the application 226. The window manager 2703 may manage, for example, Graphical User Interface (GUI) resources used on a screen. The multimedia manager 2705 may recognize, for example, formats necessary to reproduce media files, and may encode or decode a media file by using a codec suitable for the corresponding format. The resource manager 2707 may manage, for example, a source code of the application 146 or a space of a memory. The power manager 2709 may manage, for example, capacity, temperature, or power of the battery, and may determine or provide power information necessary for an operation of the electronic device 101 by using corresponding information among the capacity, temperature, or power of the battery. According to an embodiment, the power manager 2709 may operate together with a Basic Input/Output System (BIOS).

The database manager 2711 may, for example, generate, search, or modify a database to be used in the application 146. The package manager 2713 may manage, for example, installation or update of an application distributed in the form of a package file. The connectivity manger 2715 may manage, for example, a wireless or wired connection between the electronic device 101 and an external electronic device. The notification manager 2717 may provide, for example, a function of notifying a user of a generated event (e.g., a telephone call, a message, or an alarm). The location manager 2719 may manage, for example, location information of the electronic device 101. The graphic manager 2721 may manage, for example, a graphic effect to be provided to a user or a user interface related thereto. The security manager 2723 may provide, for example, system security or user authentication. The telephony manager 2725 may manage, for example, a voice call function or a video call function of the electronic device 101. The voice recognition manager 2727 may transmit, for example, voice data of the user, to the server 108, and may receive: a command corresponding to a function to be performed by the electronic device 101 based on the relevant voice data; or text data converted based on the relevant voice data. According to an embodiment, the middleware 2744 may dynamically delete some of the existing elements, or add new elements thereto. According to an embodiment, at least a part of the middleware 144 may be included as a part of the operating system 142, or may be implemented as software separate from the operating system 222.

The application 226 may include, for example, a home 2751, a dialer 2753, an SMS/MMS 2755, an Instant Message (IM) 2757, a browser 2759, a camera 2761, an alarm 2763, a contact 2765, a voice recognition 2767, an e-mail 2769, a calendar 2771, a media player 2773, an album 2775, a watch 2777, a health 2779 (e.g., measurement of exercise quantity or blood sugar), or an environmental information 2781 (e.g., atmospheric pressure, humidity, or temperature information). According to an embodiment, the application 146 may further include information exchange application (not illustrated) capable of supporting information exchange between the electronic device 101 and an external electronic device. The information exchange application may include, for example, a notification relay application for delivering specified information (e.g., a telephone call, a message, or an alarm) to the external electronic device, or a device management application for managing the external electronic device. For example, the notification relay application may deliver, to the external electronic device, notification information corresponding to an event (e.g., mail reception) generated by another application (e.g., the e-mail application 2769) of the electronic device 101, or may receive notification information from the external electronic device and provide the same to the user of the electronic device 101. For example, the device management application may control power (e.g., turning-on or turning-off) or a function (e.g., brightness, resolution, or focus) of an external electronic device, which communicates with the electronic device 101, or some elements thereof (e.g., the display apparatus 160 or the camera module 180). Additionally or alternatively, the device management application may support installation, deletion, or update of an application that operates on the external electronic device.

Each of the elements described in various embodiments of the disclosure may include one or more components, and the name of the corresponding element may vary depending on the type of electronic device. In various embodiments, an electronic device may include at least one of the elements described herein. Some of the elements may be omitted from the electronic device, or the electronic device may further include other additional elements. Further, some of the elements of the electronic device according to various embodiments may be combined to constitute a single entity, and thus may equivalently perform functions of the corresponding elements before being combined.

The term "module" used in the disclosure may refer to, for example, a unit including one or a combination of two or more of hardware, software, or firmware. The term "module" may be used interchangeably with, for example, the term "unit", "logic", "logical block", "component", or "circuit". The "module" may be a minimum unit or a part of an integrally-configured component. The "module" may be a minimum unit performing one or more functions or a part thereof. The "module" may be implemented mechanically or electronically. For example, the "module" may include at least one of an Application-Specific Integrated Circuit (ASIC) chip, Field-Programmable Gate Arrays (FPGAs), or a programmable-logic device, all of which are known or to be developed in the future and perform certain operations.

At least some of devices (e.g., modules or functions thereof) or methods (e.g., operations) according to various embodiments may be implemented by an instruction which is stored in a computer-readable storage medium, for example, in the form of a program module. When the instruction is executed by a processor (e.g., the processor 120), the at least one processor may perform a function corresponding to the instruction. A computer-readable storage medium may be, for example, the memory 160.

Examples of a computer-readable recording medium may include a hard disk, a floppy disk, a magnetic medium (e.g., a magnetic tape), an optical medium (e.g., a Compact Disc Read-Only Memory (CD-ROM) or a Digital Versatile Disc (DVD)), a magneto-optical medium (e.g., a floptical disk), a hardware device (e.g., a Read-Only Memory (ROM), a Random Access Memory (RAM), or a flash memory), and the like. Further, examples of program instructions may include high class language codes that can be executed by a computer by using an interpreter and the like, as well as machine language codes generated by a compiler. The above-described hardware device may be configured to operate as at least one software module so as to perform operations of various embodiments, and vice versa.

The module or programming module according to various embodiments may include one or more of the above-described elements or may further include other additional elements, or some of the above-described elements may be omitted therefrom. The operations performed by the modules, the programming modules, or other elements according to various embodiments may be performed in a sequential, parallel, repetitive, or heuristic manner. Further, some of the operations may be performed in different orders or omitted, or other operations may be added thereto.

Various embodiments may provide a storage medium for storing instructions configured to, when executed by at least one processor, cause the at least one processor to perform at least one operation including: in a method for processing image data, acquiring a raw image corresponding to an external object by using a camera; generating a first-level image having a first attribute and a second-level image having a second attribute, by using the raw image; transmitting a first image obtained by encoding at least a part of the first-level image to an external electronic device so that the external electronic device generates analysis information of the first image; generating a second image by encoding at least a part of the second-level image at least based on the analysis information; and transmitting the second image to the external electronic device.

Various embodiments may provide a storage medium for storing instructions configured to, when executed by at least one processor, cause the at least one processor to perform at least one operation including: in a method for processing image data, receiving a first image, obtained by encoding a first-level image having a first attribute and generated from a raw image acquired by a camera, from an external electronic device; decoding the received first image; generating analysis information by analyzing the decoded first image; transmitting the generated analysis information to the external electronic device; receiving a second image, obtained by encoding a second-level image having a second attribute and generated from the raw image based on the analysis information, from the external electronic device; and generating a synthesized image by merging the decoded first image and the received second image.

Further, the embodiments disclosed herein are provided to describe technical details of the disclosure and help understanding of the disclosure, and do not limit the scope of the disclosure. Therefore, it should be construed that the scope of the disclosure covers all modifications and changes or various other embodiments based on the technical idea of the disclosure.

The invention claimed is:
1. An electronic device comprising
a camera,
a communication module,
a display, and
a processor, wherein the processor is configured to:
acquire a raw image corresponding to an external object by using the camera;
generate a first-level image having a first attribute and a second-level image having a second attribute, by using the raw image;
transmit a first image obtained by encoding at least a part of the first-level image to an external electronic device by using the communication module so that the external electronic device generates analysis information of the first image;
generate a second image by encoding at least a part of the second-level image at least based on the analysis information; and
transmit the second image to the external electronic device by using the communication module.

2. The electronic device of claim 1, wherein the processor is configured to:
generate first-processed data from the raw image by using a first image processing scheme;
receive, from the external electronic device, second-processed data generated at least from the second image by using a second image processing scheme; and
synthesize the first-processed data and the second-processed data.

3. The electronic device of claim 2, wherein the processor is configured to:
sequentially receive multiple second-processed data, generated at least from the second image by using a second image processing scheme, from the external electronic device according to priorities; and
synthesize the second-processed data and the first-processed data according to a reception order of the multiple second-processed data.

4. The electronic device of claim 1, wherein the processor is configured to:
further generate a third image by encoding at least another part of the second-level image at least based on the analysis information;
determine a priority between the second image and the third image at least based on the analysis information; and
transmit the second image and the third image to the external electronic device according to an order determined at least based on the priority.

5. The electronic device of claim 1, wherein:
the first-level image comprises at least one piece of information among information on a low-resolution image having a reduced size or resolution compared to a raw image acquired by the camera, information on a low-frequency domain image of the raw image, and information on a higher bit-plane image of the raw image; and
the second-level image comprises at least one of a high-resolution image having an extended size or resolution compared to the first-level image, an image including higher frequency information than the first-level image, or an image including lower bit-plane information than the first-level image.

6. The electronic device of claim 1, wherein the analysis information comprises:
attribute information of each of multiple regions included in the first image; or
a compression ratio which is based on an importance level of each of the multiple regions according to an analysis result of the multiple regions.

7. An electronic device comprising
a communication module and
a processor,
wherein the processor is configured to:
receive a first image, obtained by encoding a first-level image having a first attribute and generated from a raw image acquired by a camera, from an external electronic device by using the communication module;
decode the received first image;
generate analysis information by analyzing the decoded first image;
transmit the generated analysis information to the external electronic device;
receive a second image, obtained by encoding a second-level image having a second attribute and generated from the raw image based on the analysis information, from the external electronic device; and
generate a synthesized image by merging the decoded first image and the received second image.

8. The electronic device of claim 7, wherein the analysis information comprises a compression ratio which is based on an importance level of each of the multiple regions according to an analysis result of the multiple regions.

9. A method for processing image data, the method comprising:
acquiring a raw image corresponding to an external object by using a camera;
generating a first-level image having a first attribute and a second-level image having a second attribute, by using the raw image;
transmitting a first image obtained by encoding at least a part of the first-level image to an external electronic device so that the external electronic device generates analysis information of the first image;
generating a second image by encoding at least a part of the second-level image at least based on the analysis information; and
transmitting the second image to the external electronic device.

10. The method of claim 9, comprising:
generating first-processed data from the raw image by using a first image processing scheme;
receiving, from the external electronic device, second-processed data generated at least from the second image by using a second image processing scheme; and
synthesizing the first-processed data and the second-processed data.

11. The method of claim 10, comprising:
sequentially receiving multiple second-processed data, generated at least from the second image by using a second image processing scheme, according to priorities; and
synthesizing the second-processed data and the first-processed data according to a reception order of the multiple second-processed data.

12. The method of claim 9, comprising:
generating a third image by encoding at least another part of the second-level image at least based on the analysis information;
determining a priority between the second image and the third image at least based on the analysis information; and
transmitting the second image and the third image to the external electronic device according to an order determined at least based on the priority.

13. The method of claim 9, wherein:
the first-level image comprises at least one piece of information among information on a low-resolution image having a reduced size or resolution compared to a raw image acquired by the camera, information on a low-frequency domain image of the raw image, and information on a higher bit-plane image of the raw image; and the second-level image comprises at least one of a high-resolution image having an extended size or resolution compared to the first-level image, an image including higher frequency information than the first-level image, or an image including lower bit-plane information than the first-level image.

14. The method of claim 9, wherein the analysis information comprises:
   attribute information of each of multiple regions included in the first image; or
   a compression ratio which is based on an importance level of each of the multiple regions according to an analysis result of the multiple regions.

15. A method for processing image data, the method comprising:
   receiving a first image, obtained by encoding a first-level image having a first attribute and generated from a raw image acquired by a camera, from an external electronic device;
   decoding the received first image;
   generating analysis information by analyzing the decoded first image;
   transmitting the generated analysis information to the external electronic device;
   receiving a second image, obtained by encoding a second-level image having a second attribute and generated from the raw image based on the analysis information, from the external electronic device; and
   generating a synthesized image by merging the decoded first image and the received second image.

* * * * *